(12) United States Patent
Walker et al.

(10) Patent No.: US 8,229,983 B2
(45) Date of Patent: Jul. 24, 2012

(54) CHANNEL SWITCH FRAME

(75) Inventors: Gordon Kent Walker, Poway, CA (US);
Vijayalakshmi R. Raveendran, San Diego, CA (US); Peisong Chen, San Diego, CA (US); Tao Tian, San Diego, CA (US); Fang Shi, San Diego, CA (US); Scott T. Swazey, San Diego, CA (US); Seyfullah Halit Oguz, San Diego, CA (US); Amit Rohatgi, San Diego, CA (US); Sitaraman Ganapathy Subramania, San Diego, CA (US); Phanikumar Bhamidipati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 11/527,306

(22) Filed: Sep. 25, 2006

(65) Prior Publication Data

US 2007/0073779 A1 Mar. 29, 2007

Related U.S. Application Data

(60) Provisional application No. 60/721,345, filed on Sep. 27, 2005, provisional application No. 60/760,484, filed on Jan. 20, 2006, provisional application No. 60/789,442, filed on Apr. 4, 2006.

(51) Int. Cl.
*G06F 17/30* (2006.01)
*G06F 17/00* (2006.01)
(52) U.S. Cl. ............... 707/899; 375/240.24; 348/14.01
(58) Field of Classification Search ............... 707/104.1; 375/240; 348/404; 382/232
See application file for complete search history.

(56) References Cited

U.S. PATENT DOCUMENTS

| | | | |
|---|---|---|---|
| 5,241,563 | A | 8/1993 | Paik et al. |
| 5,875,199 | A | 2/1999 | Luthi |
| 6,057,884 | A | 5/2000 | Chen et al. |
| 6,370,666 | B1 | 4/2002 | Lou et al. |
| 6,480,541 | B1 | 11/2002 | Girod |

(Continued)

FOREIGN PATENT DOCUMENTS

CN 1278138 12/2000

(Continued)

OTHER PUBLICATIONS

Jennehag U et al., "Increasing bandwidth utilization in next generation iptv networks," Image Processing, 2004. ICIP '04. 2004 International Conference on Singapore Oct. 24-27, 2004. Piscataway, NJ, USA, IEEE, Oct. 24, 2004, pp. 2075-2078.

(Continued)

*Primary Examiner* — Yicun Wu
(74) *Attorney, Agent, or Firm* — Dang M. Vo; John G. Rickenbrode

(57) ABSTRACT

Methods and apparatus to process multimedia data enabling faster channel acquisitions, improved error recovery and improved efficiency. An encoder device encodes a first portion of multimedia data using inter-coding to generate a first version, and encodes the first portion of multimedia data using intra-coding to generate a second version. A decoder device receives a first version of a first portion of multimedia data, wherein the first version is inter-coded, receives a second version of the first portion of multimedia data, wherein the second version is intra-coded, and selectively decodes the first and second received versions.

51 Claims, 15 Drawing Sheets

U.S. PATENT DOCUMENTS

| | | | |
|---|---|---|---|
| 6,535,240 B2 | 3/2003 | Yang et al. | |
| 6,611,561 B1 * | 8/2003 | Hannuksela et al. | 375/240.27 |
| 7,020,823 B2 | 3/2006 | Bushmitch et al. | |
| 7,075,986 B2 | 7/2006 | Girod | |
| 7,085,324 B2 | 8/2006 | Choi et al. | |
| 7,116,714 B2 * | 10/2006 | Hannuksela | 375/240.12 |
| 7,369,610 B2 | 5/2008 | Xu et al. | |
| 7,428,639 B2 | 9/2008 | Demos | |
| 7,552,227 B2 | 6/2009 | Wang | |
| 7,606,314 B2 * | 10/2009 | Coleman et al. | 375/240.27 |
| 2003/0014752 A1 | 1/2003 | Zaslavsky et al. | |
| 2004/0066854 A1 | 4/2004 | Hannuksela | |
| 2004/0179139 A1 | 9/2004 | Choi et al. | |
| 2004/0181811 A1 | 9/2004 | Rakib | |
| 2004/0213473 A1 | 10/2004 | Ohira | |
| 2004/0218816 A1 | 11/2004 | Hannuksela | |
| 2004/0228535 A1 | 11/2004 | Honda et al. | |
| 2004/0243913 A1 | 12/2004 | Budge et al. | |
| 2004/0244037 A1 | 12/2004 | Yamaguchi et al. | |
| 2005/0163211 A1 | 7/2005 | Shanableh | |
| 2005/0175091 A1 | 8/2005 | Puri et al. | |
| 2005/0185541 A1 | 8/2005 | Neuman | |
| 2005/0200757 A1 | 9/2005 | Pica et al. | |
| 2005/0213668 A1 | 9/2005 | Iwabuchi et al. | |
| 2006/0018379 A1 | 1/2006 | Cooper | |
| 2006/0120378 A1 | 6/2006 | Usuki et al. | |
| 2006/0120448 A1 | 6/2006 | Han et al. | |
| 2006/0146143 A1 | 7/2006 | Xin et al. | |
| 2006/0146934 A1 | 7/2006 | Caglar et al. | |
| 2006/0239299 A1 | 10/2006 | Scheid et al. | |
| 2007/0071100 A1 | 3/2007 | Shi et al. | |
| 2007/0071105 A1 | 3/2007 | Tian et al. | |
| 2007/0076796 A1 | 4/2007 | Shi et al. | |
| 2007/0083578 A1 | 4/2007 | Chen et al. | |
| 2007/0101378 A1 | 5/2007 | Jacobs | |
| 2007/0110105 A1 | 5/2007 | Usuki et al. | |
| 2007/0153914 A1 | 7/2007 | Hannuksela et al. | |
| 2007/0157248 A1 | 7/2007 | Ellis | |
| 2007/0288959 A1 | 12/2007 | Istvan et al. | |
| 2008/0196061 A1 | 8/2008 | Boyce | |
| 2009/0222856 A1 | 9/2009 | Kim et al. | |
| 2009/0245393 A1 | 10/2009 | Stein et al. | |
| 2010/0021143 A1 | 1/2010 | Toma et al. | |
| 2010/0153999 A1 | 6/2010 | Yates | |

FOREIGN PATENT DOCUMENTS

| | | |
|---|---|---|
| CN | 1478355 | 2/2004 |
| CN | 1674674 A | 9/2005 |
| CN | 100337480 | 9/2005 |
| CN | 1830164 | 9/2006 |
| EP | 0966162 A1 | 12/1999 |
| EP | 1061737 A1 | 12/2000 |
| EP | 1657835 A1 | 5/2006 |
| EP | 1715680 A1 | 10/2006 |
| EP | 1941738 | 12/2010 |
| JP | 8307786 A | 11/1996 |
| JP | 2004507178 T | 3/2004 |
| JP | 2004350263 A | 12/2004 |
| JP | 2006505024 A | 2/2006 |
| KR | 20040074365 A | 8/2004 |
| KR | 20040074635 | 8/2004 |
| KR | 20060015757 A | 2/2006 |
| KR | 20060113765 | 2/2006 |
| KR | 20060024416 | 3/2006 |
| RU | 2201654 | 3/2003 |
| RU | 2328086 C2 | 6/2008 |
| WO | WO9216071 | 9/1992 |
| WO | WO0167777 | 9/2001 |
| WO | WO0215589 A1 | 2/2002 |
| WO | WO03073753 | 9/2003 |
| WO | WO03098475 A1 | 11/2003 |
| WO | WO2004114667 A1 | 12/2004 |
| WO | WO2004114668 A1 | 12/2004 |
| WO | WO2005043783 | 5/2005 |
| WO | WO2005067191 A1 | 7/2005 |
| WO | WO2005076503 | 8/2005 |
| WO | WO2005106875 A1 | 11/2005 |
| WO | WO2005112465 A1 | 11/2005 |
| WO | WO2006104519 | 10/2006 |
| WO | WO2007038726 | 4/2007 |
| WO | WO2007042916 | 4/2007 |

OTHER PUBLICATIONS

Bormans J et al., "Video Coding with H.264/AVC: tools, performance and complexity," IEEE Circuits and Systems Magazine, IEEE Service Center, New York, NY, US, vol. 4, No. 1, Jan. 2004, pp. 7-28.

Huifang Sun et al., "Error Resilience Video Transcoding for Wireless Communications," IEEE Wireless Communications, IEEE Service Center, Piscataway, NJ, US, vol. 12, No. 4, 2005-08, pp. 14-21.

International Search Report—PCT/US06/037942—International Search Authority—European Patent Office—Apr. 10, 2004.

Written Opinion—PCT/US06/037942—International Search Authority—European Patent Office, Munich—Apr. 10, 2007.

International Preliminary Report on Patentability—PCT/US06/037942—International Search Authority—The International Bureau of WIPO—Geneva, Switzerland—Apr. 1, 2008.

Bernd Girod, "The information theoretical significance of spatial and temporal masking in video signals," SPIE vol. 1077, Human vision, visual processing, and digital display, pp. 178-187 (1989).

Casoulat, R, et al., "On the Usage of Laser Video for mobile broadcast," Video Standards and Drafts, ISO/IEC JTC1/SC29/WG11, MPEG/M12032, Busan, Apr. 29, 2005, pp. 1-7.

European Search Report—EP10181358 , Search Authority—Munich Patent Office,Jan. 25, 2011.

Faerber N. et al: "Robust H.263 compatible video transmission for mobile access to video servers" Proceeding of the International Conference on Image Processing. ICIP 1997. Oct. 26-29, 1997, vol. 2, Oct. 26, 1997, pp. 73-76, XP002171169.

Iain Richardson, H.264 and MPEG-4 video coding—next-generation standards, Moscow, Tehnosfera, 2005, pp. 186-197, 220-224.

ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.

Karczewicz M et al.: "The SP- and SI-frame design for H.264/AVC," IEEE Transactions on Circuits and Systems for Video Technology, Jul. 2003, pp. 637-644, vol. 13, No. 7, XP011099256, ISSN: 1051-8215.

Taiwanese Search Report—095135836—TIPO—May 12, 2010.

TIA-1099 Standard "Forward Link Only Air Interface Specificaiton for Terrestrial Mobile Multimedia Multicast" pp. 1-341, Mar. 2007.

Translation of Office Action in Japan application 2008-533617 corresponding to U.S. Appl. No. 11/527,306, citing JP2004350263 and JP2004507178 dated Feb. 1, 2011.

Wiegand T: "H.264/AVC Video Coding Standard", Berlin, Germany, May 2003.

European Search Report—EP10181435—Search Authority—Munich—Jan. 25, 2011.

* cited by examiner

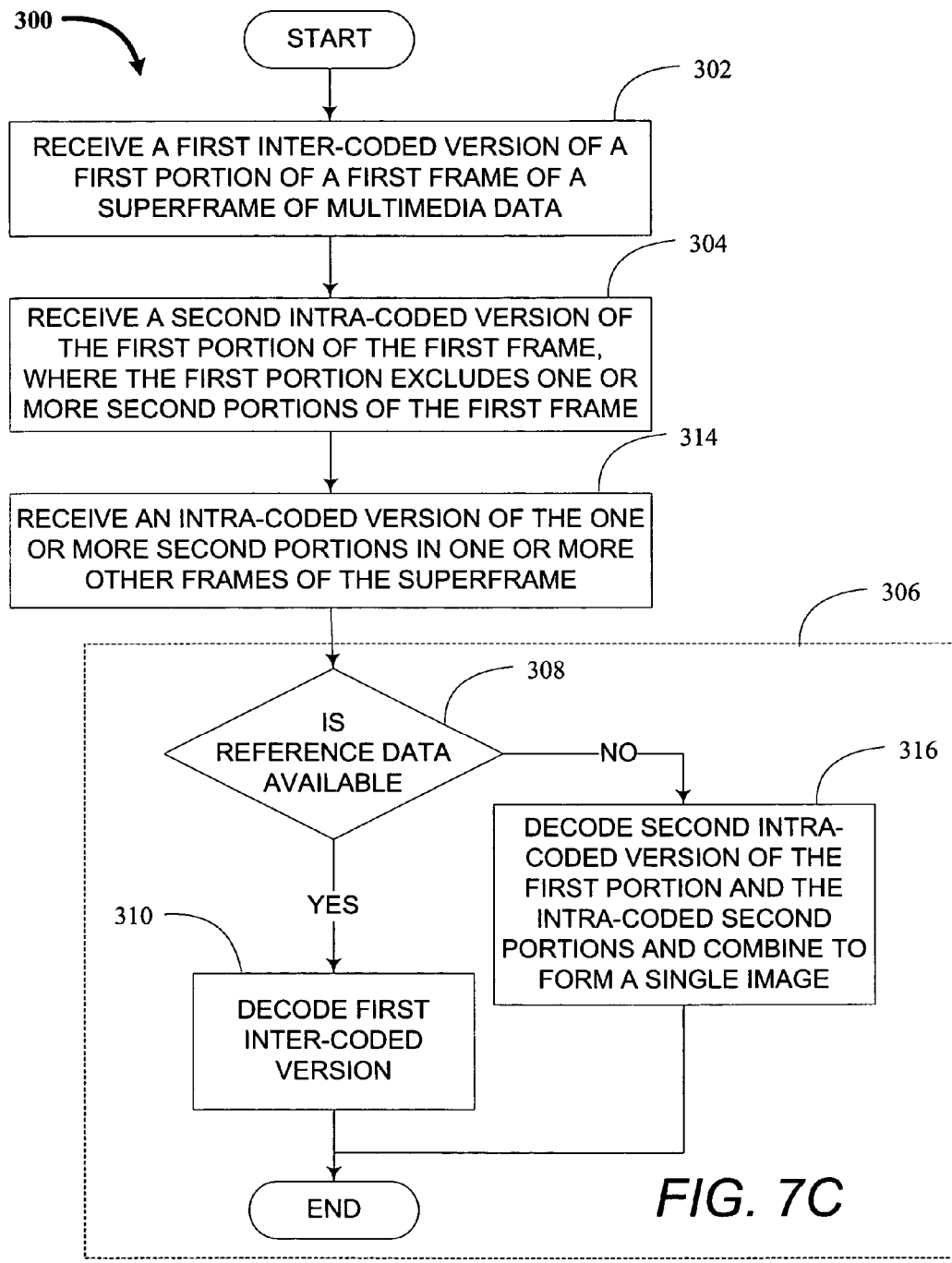

CHANNEL SWITCH FRAME

CROSS-REFERENCE TO RELATED APPLICATIONS

Claim of Priority under 35 U.S.C. §119

The present Application for Patent claims the benefit of four U.S. Provisional Applications having the following Ser. Nos.: (1) 60/721,345, entitled "A METHOD OF VIDEO COMPRESSION," filed Sep. 27, 2005; (2) 60/760,484, entitled "A METHOD OF FAST CHANNEL SWITCHING," filed Jan. 20, 2006; (3) 60/789,442, entitled "CHANNEL SWITCH FRAME," filed Apr. 4, 2006; and (4) 60/846,295, entitled "CHANNEL SWITCH FRAME," filed Sep. 20, 2006. Each provisional patent application is assigned to the assignee hereof and hereby expressly incorporated by reference herein.

BACKGROUND

1. Field

The disclosure is directed to multimedia signal processing and, more particularly, to video encoding and decoding.

2. Description of the Related Art

Multimedia processing systems, such as video encoders, may encode multimedia data using encoding methods based on international standards such as Moving Picture Experts Group (MPEG)-1, -2 and -4 standards, the International Telecommunication Union (ITU)-T H.263 standard, and the ITU-T H.264 standard and its counterpart, ISO/EEC MPEG-4, Part 10, i.e., Advanced Video Coding (AVC). Such encoding methods generally are directed to compressing the multimedia data for transmission and/or storage. Compression is broadly the process of removing redundancy from the data.

A video signal may be described in terms of a sequence of pictures, which include frames (an entire picture), or fields (e.g., an interlaced video stream comprises fields of alternating odd or even lines of a picture). As used herein, the term "frame" refers to a picture, a frame or a field. Video encoding methods compress video signals by using lossless or lossy compression algorithms to compress each frame. Intra-frame coding (herein referred to as intra-coding) refers to encoding a frame using only that frame. Inter-frame coding (herein referred to as inter-coding) refers to encoding a frame based on other, "reference," frames. For example, video signals often exhibit temporal redundancy in which frames near each other in the temporal sequence of frames have at least portions that are match or at least partially match each other.

Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. As used herein, the term "block" refers to either a macroblock or a subblock.

Encoders take advantage of this temporal redundancy using inter-coding motion compensation based algorithms. Motion compensation algorithms identify portions of a reference frame that at least partially matches a block. The block may be shifted in the frame relative to the matching portion of the reference frame. This shift is characterized by a motion vector. Any differences between the block and partially matching portion of the reference frame may be characterized in terms of a residual. The encoder may encode a frame as data that comprises one or more of the motion vectors and residuals for a particular partitioning of the frame. A particular partition of blocks for encoding a frame may be selected by approximately minimizing a cost function that, for example, balances encoding size with distortion to the content of the frame resulting from an encoding.

Inter-coding enables more compression efficiency than intra-coding. However, inter-coding can create problems when reference data (e.g., reference frames or reference fields) are lost due to channel errors etc. In addition to loss of reference data due to errors, reference data may also be unavailable due to initial acquisition or reacquisition of the video signal at an inter-coded frame. In these cases, decoding of inter-coded data may not be possible or may result in undesired errors and error propagation. These scenarios can result in a loss of synchronization of the video stream. An independently decodable intra-coded frame is the most common form of frame that enables resynchronization of the video signal. The MPEG-x and H.26x standard use what is known as a group of pictures (GOP) which comprises an intra-coded frame (also called an I-frame) and temporally predicted P-frames or bi-directionally predicted B frames that reference the I-frame and/or other P and/or B frames within the GOP. Longer GOP's are desirable for the increased compression, but shorter GOP's allow for quicker acquisition and resynchronization. Increasing the number of I-frames will permit quicker acquisition and resynchronization, but at the expense of lower compression. What is needed is a way to enable fast acquisition and resynchronization of the video stream while preserving compression efficiency.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the sample features of this invention provide advantages that include faster channel acquisitions, improved error recovery and improved efficiency.

A method of processing multimedia data is provided. The method includes encoding a first portion of multimedia data using inter-coding to generate a first version, and encoding the first portion of the multimedia data using intra-coding to generate a second version.

A multimedia data processor is provided. The processor includes a configuration to encode a first portion of multimedia data using inter-coding to generate a first version, and encode the first portion of multimedia data using intra-coding to generate a second version.

An apparatus for processing multimedia data is provided. The apparatus includes a first encoder to encode a first portion of multimedia data using inter-coding to generate a first version, and a second encoder to encode the first portion of multimedia data using intra-coding to generate a second version.

A machine readable medium is provided. The machine readable medium includes instructions that upon execution cause a machine to encode a first portion of multimedia data using inter-coding to generate a first version, and encode the first portion of multimedia data using intra-coding to generate a second version.

A method of processing multimedia data is provided. The method includes receiving a first version of a first portion of multimedia data, wherein the first version is inter-coded, receiving a second version of the first portion of multimedia data, wherein the second version is intra-coded, and selectively decoding the first and second received versions.

A multimedia data processor is provided. The processor includes a configuration to receive a first version of a first portion of multimedia data, wherein the first version is inter-coded, receive a second version of the first portion of multimedia data, wherein the second version is intra-coded, and selectively decode the first and second received versions.

An apparatus for processing multimedia data is provided. The apparatus includes a receiver to receive a first version of a first portion of multimedia data, wherein the first version is inter-coded, and to receive a second version of the first portion of multimedia data, wherein the second version is intra-coded, and a decoder to selectively decode the first and second received versions.

A machine readable medium is provided. The machine readable medium includes instructions that upon execution cause a machine to receive a first version of a first portion of multimedia data, wherein the first version is inter-coded, receive a second version: of the first portion of multimedia data, wherein the second version is intra-coded, and selectively-decode the first and second received versions.

A method for transmitting digital video data is provided. The method includes transmitting inter-coded digital video frames for each of a plurality of digital video channels, and transmitting channel switch frames for each of the channels, wherein at least one of the channel switch frames comprises intra-coded digital video data corresponding to one of the inter-coded frames for the respective channel.

A method for receiving digital video data is provided. The method includes obtaining inter-coded frames that comprise inter-coded digital video data associated with a first channel, receiving a request to switch to a second channel, and in response to the request, obtaining a channel switch frame comprising intra-coded digital video data corresponding to one of the inter-coded frames for the second channel.

BRIEF DESCRIPTION OF THE DRAWINGS

FIG. 7C is a flowchart illustrating in more detail another example of a portion of the method illustrated in FIG. 7A.

DETAILED DESCRIPTION OF CERTAIN EMBODIMENTS

The following detailed description is directed to certain sample embodiments of the invention. However, the invention can be embodied in a multitude of different ways as defined and covered by the claims. In this description, reference is made to the drawings wherein like parts are designated with like numerals throughout.

Video signals may be characterized in terms of a series of pictures, frames, or fields. As used herein, the term "frame" is a broad term that may encompass either frames of a progressive video signal or fields of an interlaced video signal.

Embodiments include systems and methods of improving processing in an encoder and a decoder in a multimedia transmission system. Multimedia data may include one or more of motion video, audio, still images, or any other suitable type of audio-visual data. Embodiments include an apparatus and method of encoding video data. For example, one aspect comprises a method of encoding first and second versions of a frame of video data wherein one of the versions enables acquisition and/or resynchronization of a video stream. In particular, it has been found that inter-coding a first version of video data and intra-coding a second version of the video data according to one aspect allows a decoding device to selectively decode the second version enabling acquisition if appropriate. Other embodiments include an apparatus and method of decoding video data encoded according to the above embodiments. For example, it has been found according to one aspect that selectively decoding the intra-coded version when reference data upon which the inter-coded version depends is not available allows a decoding device to acquire and/or resynchronize a video stream. In particular, it has been found that user experience can be improved by providing an increased number of acquisition frames, in a bit rate efficient manner according to one aspect, without significantly affecting the quality perceived by the user.

Multimedia Distribution System

Figure 1:
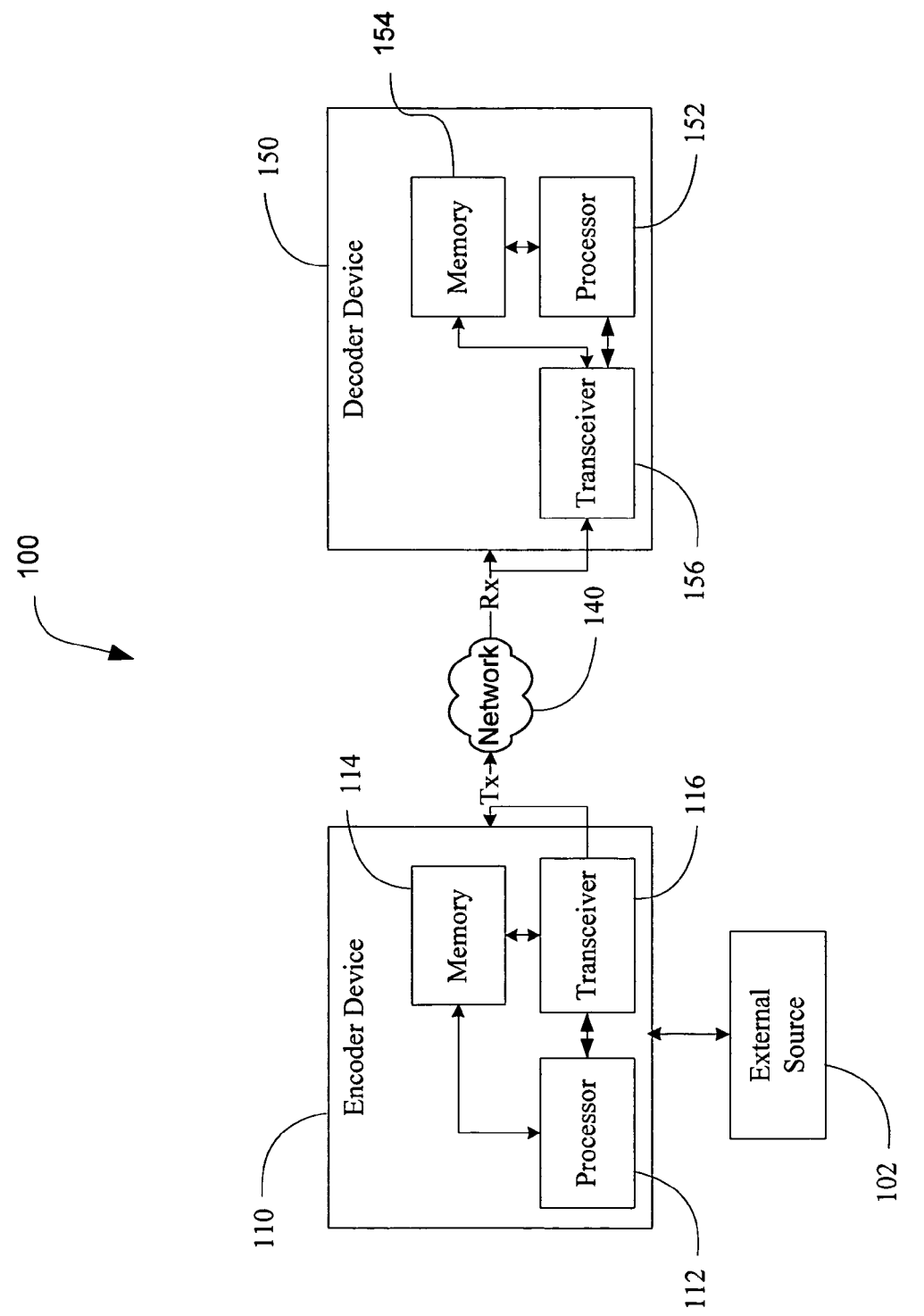
FIG. 1 is a block diagram illustrating a multimedia communications system according to one aspect.

FIG. 1 is a block diagram illustrating a multimedia communications system 100 according to one aspect. The system 100 includes an encoder device 110 in communication with a decoder device 150 via a network 140. In one example, the encoder device receives a multimedia signal from an external source 102 and encodes that signal for transmission on the network 140.

In this example, the encoder device 110 comprises a processor 112 coupled to a memory 114 and a transceiver 116. The processor 112 encodes data from the multimedia data source and provides it to the transceiver 116 for communication over the network 140.

In this example, the decoder device 150 comprises a processor 152 coupled to a memory 154 and a transceiver 156. The processor 152 may include one or more of a general purpose processor and/or a digital signal processor. The memory 154 may include one or more of solid state or disk based storage. The transceiver 156 is configured to receive multimedia data over the network 140 and provide it to the processor 152 for decoding. In one example, the transceiver 156 includes a wireless transceiver. The network 140 may comprise one or more of a wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, or a DVB-H system.

Figure 2A:
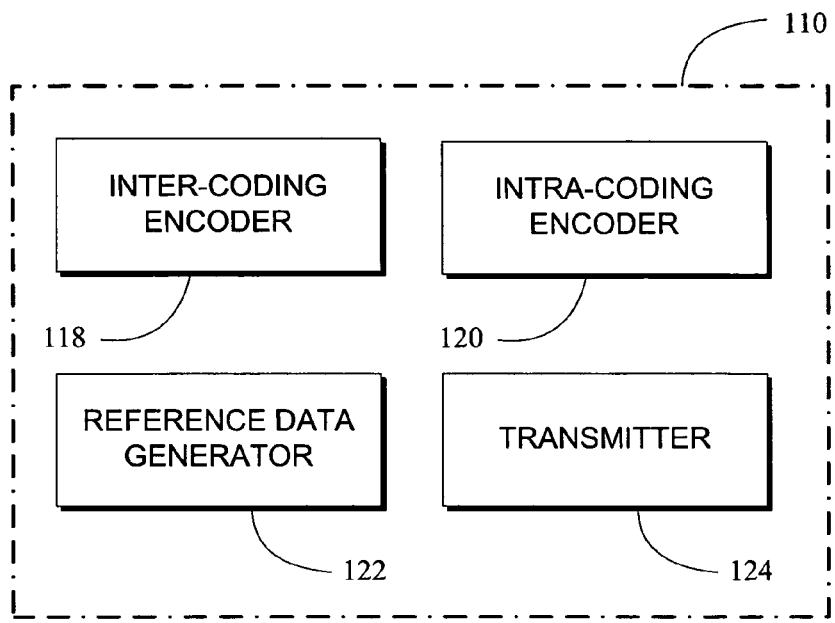
FIG. 2A is a block diagram illustrating an embodiment of an encoder device that may be used in a system such as illustrated in FIG. 1.

FIG. 2A is a block diagram illustrating an embodiment of the encoder device 110 that may be used in a system such as the system 100 illustrated in FIG. 1. In this embodiment, the encoder 110 comprises an inter-coding encoder element 118, an intra-coding encoder element 120, a reference data generator element 122 and a transmitter element 124. The inter-coding encoder 118 encodes inter-coded portions of video that are predicted temporally (e.g., using motion compensated prediction) in reference to other portions of video data located in other temporal frames. The intra-coding encoder 120 encodes intra-coded portions of video that can be decoded independently without reference to other temporally located video data. In some embodiments, the intra-coding encoder 120 may use spatial prediction to take advantage of redundancy in the other video data located in the same temporal frame.

The reference data generator 122, in one aspect, generates data that indicates, where the intra-coded and inter-coded video data generated by the encoders 120 and 118 respectively are located. For example, the reference data may include identifiers of subblocks and/or macroblocks that are used by a decoder to locate a position within a frame. The reference data may also include a frame sequence number used to locate a frame within a video frame sequence.

The transmitter 124 transmits the inter-coded data, the intra-coded data, and, in some embodiments, the reference data, over a network such as the network 140 of FIG. 1. The data may be transmitted over one or more communication links. The terms communication links are used in a general sense and can include any channels of communication including, but not limited to, wired or wireless networks, virtual channels, etc. In some embodiments the intra-coded data is transmitted on a base layer communication link and the inter-coded data is transmitted over an enhancement layer communication link. In some embodiments, the intra-coded data and the inter-coded data are transmitted over the same communication link. In some embodiments, one or more of the inter-coded data, the intra-coded data and the reference data may be transmitted over a sideband communication link. For example, a sideband communication link such as the Supplemental Enhancement Information (SEI) messages of H.264 or user_data messages of MPEG-2 may be used. In some embodiments, one or more of the intra-coded date, the inter-coded data and the reference data are transmitted over a virtual channel. A virtual channel may comprise data packets containing an identifiable packet header that identifies the data packet as belonging to the virtual channel. Other forms of identifying a virtual channel are known in the art such as frequency division, time division, code spreading, etc.

In some embodiments, one or more of the elements of the encoder 110 of FIG. 2A may be rearranged and/or combined. The elements may be implemented by hardware, software, firmware, middleware, microcode or any combination thereof. Details of the actions performed by the elements of the encoder 110 will be discussed in reference to the methods illustrated in FIG. 3 below.

Figure 2B:
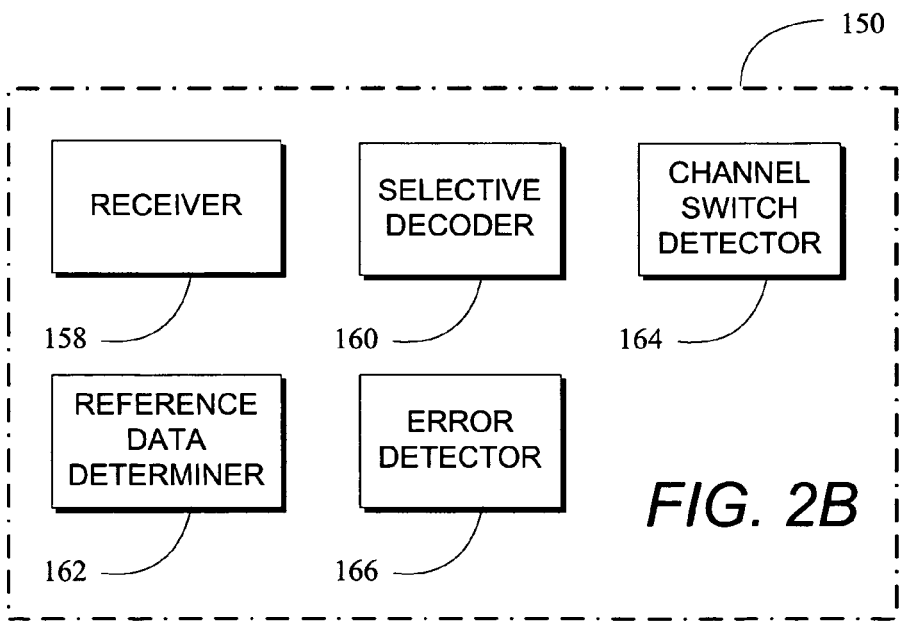
FIG. 2B is a block diagram illustrating an embodiment of a decoder device that may be used in a system such as illustrated in FIG. 1.

FIG. 2B is a block diagram illustrating an embodiment of the decoder device 150 that may be used in a system such as the system 100 illustrated in FIG. 1. In this embodiment, the decoder 150 comprises a receiver element 158, a selective decoder element 160, a reference data determiner element 162, and one or more reference data availability detectors such as a channel switch detector element 164 and an error detector element 166.

The receiver 158 receives encoded video data (e.g., data encoded by the encoder 110 of FIGS. 1 and 2A). The receiver 158 may receive the encoded data over a wired: or wireless network such as the network 140 of FIG. 1. The data may be received over one or more communication links. In some embodiments, the intra-coded data is received on a base layer communication link and the inter-coded data is received over an enhancement layer communication link. In some embodiments, the intra-coded data and the inter-coded data are received over the same communication link. In some embodiments, one or more of the inter-coded data, the intra-coded data and the reference data may be received over a sideband communication link. For example, a sideband communication link such as the Supplemental Enhancement Information (SEI) messages of H.264 or user_data messages of MPEG-2 may be used. In some embodiments, one or more of the intra-coded data, the inter-coded data and the reference data are received over a virtual channel. A virtual channel may comprise data packets containing an identifiable packet header that identifies the data packet as belonging to the virtual channel. Other forms of identifying a virtual channel are known in the art.

The selective decoder 160 decodes the received inter-coded and intra-coded video data. In some embodiments, the received data comprises an inter-coded version of a portion of video data and an intra-coded version of the portion of video data. Inter-coded data can be decoded after the reference data upon which it was predicted is decoded. For example, data encoded using motion compensated prediction comprises a motion vector and a frame identifier identifying the location of the reference data. If the portion of the frame identified by the motion vector and the frame identifier of the inter-coded version is available (e.g., already decoded), then the selective decoder 160 can decode the inter-coded version. If however, the reference data is not available, then the selective decoder 160 can decode the intra-coded version.

The reference data determiner 162, in one aspect, identifies received reference data that indicates where the intra-coded and inter-coded video data in the received encoded video data are located. For example, the reference data may include identifiers of subblocks and/or macroblocks that are used by the selective decoder 160 to locate a position within a frame. The reference data may also include a frame sequence number used to locate a frame within a video frame sequence. Using this received reference data enables a decoder to determine if the reference data upon which inter-coded data depends is available.

Reference data availability can be affected by a user switching a channel of a multi-channel communication system. For example, multiple video broadcasts may be available to the receiver 158. If a user commands the receiver 158 to change to a different broadcast channel, then reference data for the inter-coded data on the new channel may not be immediately available. The channel switch detector 164 detects that a channel switch command has been issued and signals the selective decoder 160. Selective decoder 160 can then use information obtained from the reference data determiner to identify if reference data of the inter-coded version is unavailable, and then identify the location of the nearest intra-coded version and selectively decode the identified intra-coded version.

Reference data availability can also be affected by errors in the received video data. The error detector 166 can utilize error detection techniques (e.g., forward error correction) to identify uncorrectable errors in the bitstream. If there are uncorrectable errors in the reference data upon which the inter-coded version depends, then the error detector 166 can signal the selective decoder 160 identifying which video data are affected by the errors. The selective decoder 160 can then determine whether to decode the inter-coded version (e.g., if the reference data is available) or to decode the intra-coded version (e.g., if the reference data is not available).

In some embodiments, one or more of the elements of the decoder 150 of FIG. 2B may be rearranged and/or combined. The elements may be implemented by hardware, software, firmware, middleware, microcode or any combination thereof. Details of the actions performed by the elements of the decoder 110 will be discussed in reference to the methods illustrated in FIG. 7 below.

Switch Frame Encoding Method

Figure 3A:
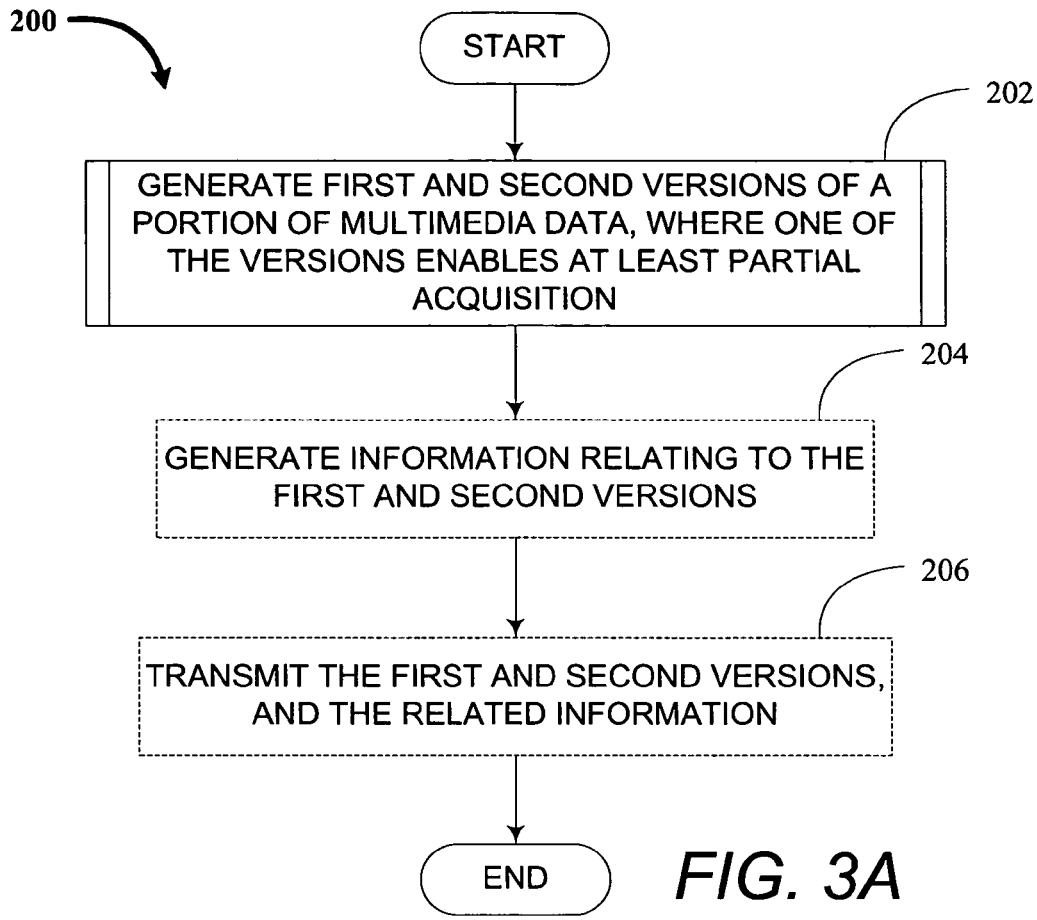
FIG. 3A is a flowchart illustrating an example of a method of encoding a portion of a video stream in a system such as illustrated in FIG. 1.

FIG. 3A is a flowchart illustrating an example of a method of encoding a portion of a video stream in a system such as illustrated in FIG. 1. In this example, the method generates multiple versions of a portion of multimedia data, where one of the versions allows at least partial acquisition and/or resynchronization of the portion of multimedia data. The version allowing partial acquisition is independently decodable, such as the intra-coded data discussed above. Predictive inter-coding can be used for one of the versions in order to take advantage of the increased compression efficiency of inter-coding. In one aspect, the method of FIG. 3A provides for an efficient way of providing random access points in a video bitstream. More frequent random access points allow for faster acquisition of a channel when a channel is initiated such as when a user commands a receiving device to switch channels. More frequent random access points also allow for faster resynchronization if synchronization of a video bitstream is loss due to errors or unreliable channel conditions.

Referring to FIG. 3A, the method 200 begins at block 202 where an encoding device generates first and second versions of a portion of multimedia data, where one of the versions enables at least partial acquisition. For illustration only, the second version will be assumed to enable partial acquisition. In this example, partial acquisition refers to being able to independently decode the second version of the portion of the frame without reference to other multimedia data, e.g., by way of an intra-coded frame or intra-coded blocks in a frame. If the portion of the frame that the second version represents is the entire frame, then full acquisition of the frame will be possible. Partial acquisition can refer to being able to decode data portion of the frame without reference to other previously decoded or to-be-decoded multimedia. For example, intra-coding as discussed above, is independently decodable and thereby enables acquisition. The portion of multimedia data may be an entire frame or a field of a frame. In one example, the encoding device 110 of FIGS. 1 and/or 2A generates the first and second versions at block 202.

The method 200 continues at optional block 204, where the encoding device generates information relating to the first and second versions. In one aspect, the generated information comprises data that indicates that the second version of redundant multimedia data is available and data that indicates where the portions of multimedia data represented by the first and second versions are located. For example, the reference data may include identifiers of subblocks and/or macroblocks that are used by a decoder to locate a position within a frame. The reference data may also include a frame number used to locate a frame within a video frame sequence. In one example, the reference data generator 122 in FIG. 2A generates the information at block 204. In some embodiments, the actions of optional block 204 in this example may be omitted. For example, a predetermined frame number and or predetermined sequence of macroblocks or subblocks may be generated periodically such that a decoder device knows in advance that the first and second versions will be received for a certain frame portion at a certain time of the bitstream.

Moving to optional block 206, the encoding device transmits the first and second versions and optionally the reference data information generated at block 204. The data may be transmitted over one or more communication links. In some embodiments, the second version of encoded data (the version enabling acquisition in this example) is transmitted on a base layer communication link and the first version of encoded data is transmitted over an enhancement layer communication link. In some embodiments, the first and second versions are transmitted over the same communication link. In some embodiments, one or more of the first version, the second version and the reference data may be transmitted over a sideband communication link. In some embodiments, one or more of the first version, the second version and the reference data are transmitted over a virtual channel. A virtual channel may comprise data packets containing an identifiable packet header that identifies the data packet as belonging to the virtual channel. Other forms of identifying a virtual channel are known in the art. The transmitter 124 of FIG. 2A may perform the transmitting actions at optional block 206.

It is to be recognized that depending on the embodiment, certain acts or events of any of the methods described herein can be performed in a different sequence, may be added, merged, or left out all together (e.g., not all described acts or events are appropriate for the practice of the method). Moreover, in certain embodiments, acts or events may be performed concurrently, e.g., through multi-threaded processing, interrupt processing, or multiple processors, rather than sequentially.

Figure 3B:
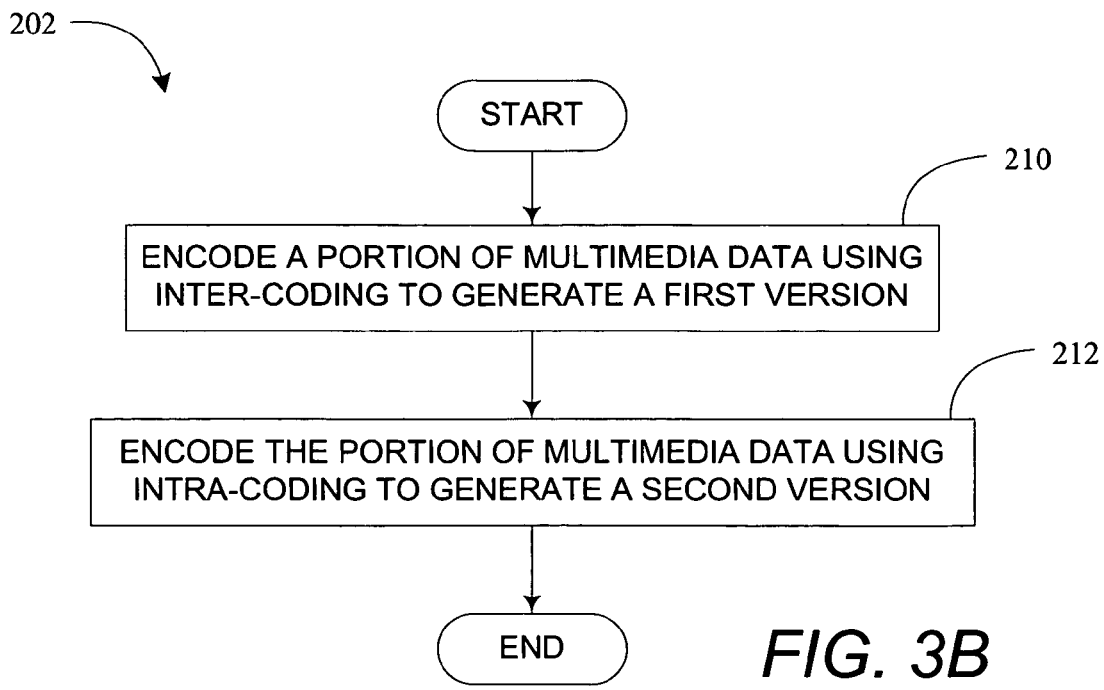
FIG. 3B is a flowchart illustrating in more detail an example of block 202 of the method illustrated in FIG. 3A.

FIG. 3B is a flowchart illustrating in more detail an example of block 202 of the method illustrated in FIG. 3A. In particular, the block 202 of FIG. 3A is shown comprising two blocks 210 and 212. At block 210, the first version of multimedia is generated by the encoder device using inter-coding. Inter-coding can be motion compensated prediction. The inter-coding encoder 118 in FIG. 2A can perform the inter-coding at block 210. At block 212, the second version of multimedia is generated by the encoder device using intra-coding. Thus the second version can be independently decoded, thereby enabling acquisition and/or resynchronization. The intra-coding encoder 120 of FIG. 2A can perform the intra-coding at block 212.

Figure 4:
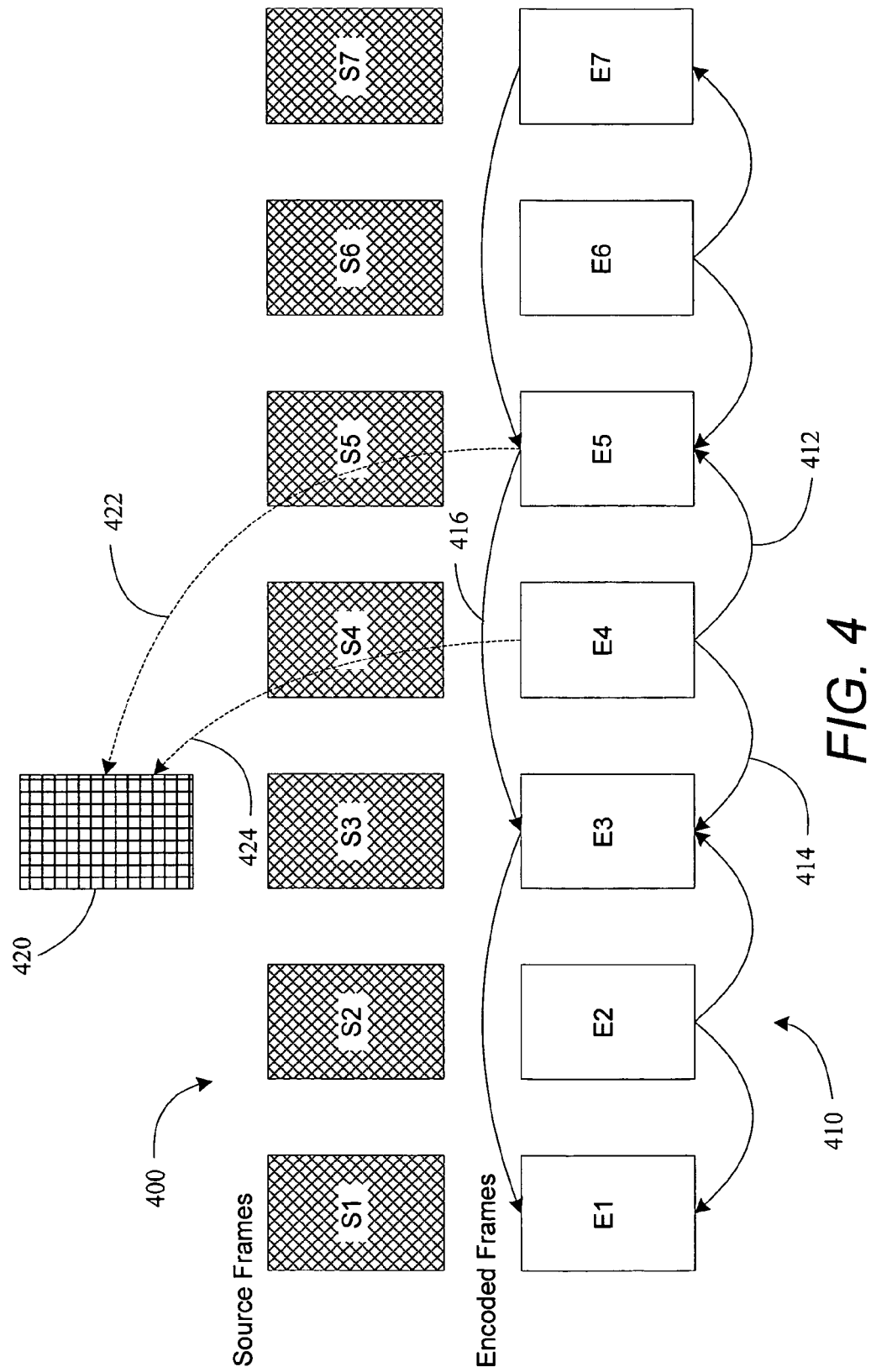
FIG. 4 graphically illustrates portions of the video stream encoded using the methods illustrated in FIGS. 3A and 3B.

FIG. 4 graphically illustrates portions of a video stream encoded using the methods illustrated in FIG. 3A and particularly FIG. 3B. The example illustrates a portion of a source video sequence 400 comprising source frames labeled S1 through S7. The source sequence 400 represents the multimedia data that the encoder device performing the method 200 of FIG. 3B is compressing. The example also contains an encoded sequence 410 comprising encoded frames labeled E1 through E7. The encoded frames represent compressed versions of the respective source frames encoded by various inter-coding and/or intra-coding techniques. For example, encoded frame E1 may be an intra-coded version of source frame S1, such as may occur at the start of a video sequence or at a scene change. The other encoded frames in the encoded sequence 410 comprise inter-coded portions that are predicted from other frames in the sequence 410 as illustrated by the arrows 412, 414 and 416. For example, Frame E5, representing the source frame S5, is depicted as a P-frame comprising motion vectors pointing to portions of the encoded frame E3 as illustrated by the arrow 416. Frame E4, representing the source frame S4, is illustrated as a B-frame comprising motion vectors pointing to portions of encoded frames E3 and E5 as illustrated by the arrows 414 and 412, respectively. It should be noted that a frame can contain more than one type of inter-coded and/or intra-coded portions. For example, encoded frame E5, depicted as a P-frame as indicated by the arrow 416, may also contain portions that are intra-coded, portions predicted from another frame, and portions predicted from multiple frames (e.g., bi-directionally predicted portions).

The encoded frame sequence 410 can be decoded normally when all reference frames, upon which inter-coded portions depend, are received. Errors introduced during transmission across a network can hinder or render impossible, the decoding of inter-coded portions. In addition, initial acquisition of the sequence 410 (due to a channel switch, for example) at any point except at encoded frame E1, an intra-coded frame in this example, can result in erroneous decoded multimedia data. In order to enable resynchronization of the encoded sequence 410, e.g. due to erroneous reference data and/or initial acquisition, a second version of the source frame S3, frame 420, is encoded. In this example, the frame 420 is the second version of the multimedia data encoded at block 212 in the method of FIG. 3B, whereas the encoded Frame E3 is the first version of the multimedia data encoded at block 210. In this example, frame 420 is entirely intra-coded and therefore can be decoded independently in its entirety. A decoder device can determine if reference data is available for decoding encoded frame E3, and if it is available, frame 420 can be discarded. If however, reference data, upon which frame E3 depends, is missing, then frame 420 can be decoded instead of encoded frame E3. This may be done for resynchronization of an existing video sequence that was disrupted by erroneously received reference data, or for acquisition of a new channel. Without loss of generality, a frame such as frame 420 representing the second version, encoded at block 212 in this example, will be referred to herein as a switch frame with the understanding that a switch frame can be used for purposes other than channel switching (e.g., stopping error propagation, enabling resynchronization, or permitting fast forward or rewind).

If the switch frame 420 is decoded instead of frame E3, then subsequent frames in the encoded sequence 410 that depended upon frame E3 can be decoded in reference to frame 420. For example, encoded frame E5 is a P-frame that depended upon frame E3 as indicated by the arrow 416. Frame E5 can be decoded by referencing the decoded switch frame 420 as illustrated by the dashed arrow 422. Similarly, B-frame E4 can be decoded by referencing the switch frame 420, as indicated by the dashed arrow 424, and referencing the encoded frame E5 as indicated by the arrow 412. After decoding the frames in the encoded sequence 410 that depend upon frame E3 (where they are decoded in reference to the switch frame 420 in this example), the remaining frames in the sequence 410 can be decoded in the normal manner. The switch frame is encoded such that subsequent frames do not include a reference to any frame preceding the switch frame.

The encoded frame E3 was chosen arbitrarily for the explanation of the example illustrated in FIG. 4. Various methods of choosing a location of a switch frame in a video sequence can be used. Details of these methods will be discussed below.

The example illustrated in FIG. 4 depicted the second version of multimedia data encoded at block 212 of FIG. 3B as comprising an entire frame. However, it should be noted, that the method 200 can be utilized in other examples where only a portion of the frame is encoded as a first version and a second version. In these examples, the second version enables acquisition of the portion of the frame comprising the second version. Examples discussed below in reference to FIGS. 3C, 3D, 5 and 6 will illustrate this point.

Figure 3C:
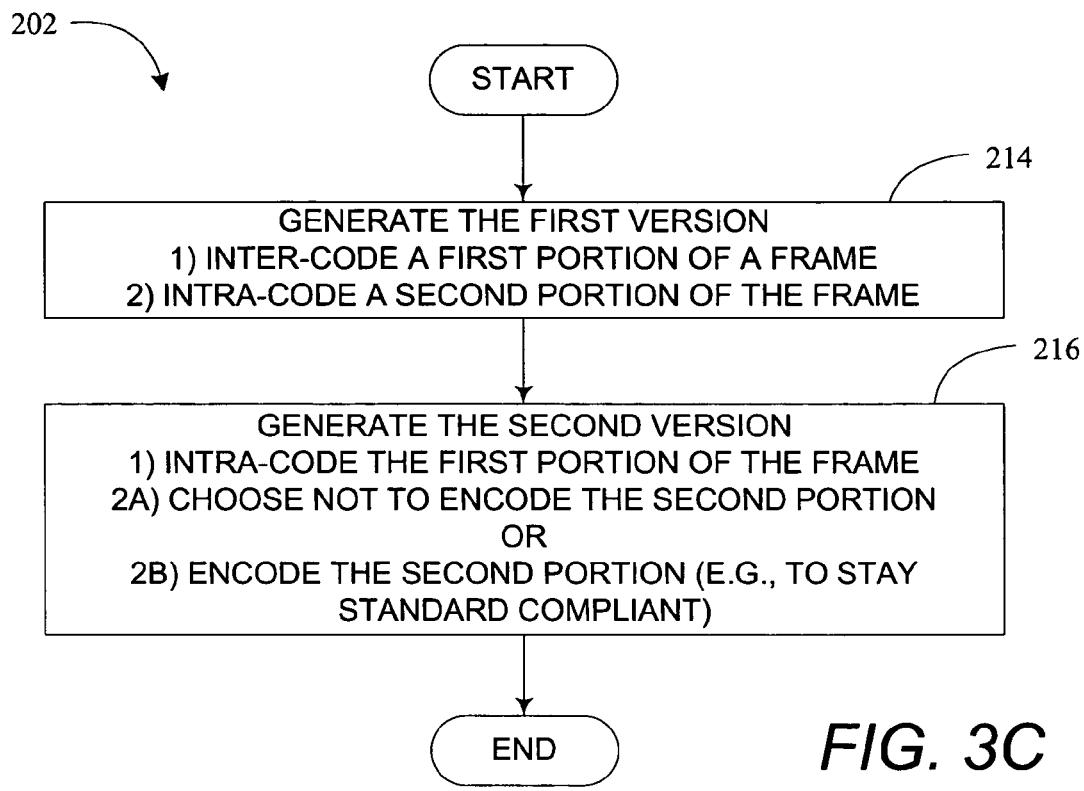
FIG. 3C is a flowchart illustrating in more detail another example of block 202 of the method illustrated in FIG. 3A.

FIG. 3C is a flowchart illustrating in more detail another example of block 202 of the method illustrated in FIG. 3A. In particular, the block 202 of FIG. 3A is shown comprising two blocks 214 and 216. At block 214, the first version of multimedia is generated by the encoder device using inter-coding for a first portion of a frame and using intra-coding for a second portion of the frame. Inter-coding can be motion compensated prediction. The inter-coding encoder 118 in FIG. 2A can perform the inter-coding at block 214, while the intra-coding encoder 120 can perform the intra-coding at block 214.

At block 216, the second version of multimedia data is generated by the encoder device using intra-coding for the first portion. Thus the second version of the first portion of the frame can be independently decoded, thereby enabling acquisition and/or resynchronization of at least the first portion of the switch frame. The intra-coding encoder 120 of FIG. 2A can perform the intra-coding at block 216. The encoder device can choose not to encode the one or more second portions of the frame since an intra-coded version is already available to the decoder in the first version encoded at block 214. However, the encoder may choose to encode the one or more second portions in order to, for example, maintain compliance with a standard where each region of a frame needs to be encoded. In some embodiments, the encoder may choose to encode the second portion of the frame using the least amount of bits possible. This may be achieved by encoding with as coarse a quantization method as is available, thus using the least amount of bits to represent the intra-coded coefficients. Other methods of encoding the second portion known to those in the art can also be used. A detailed example using the method of FIG. 3C is now discussed.

Figure 5:
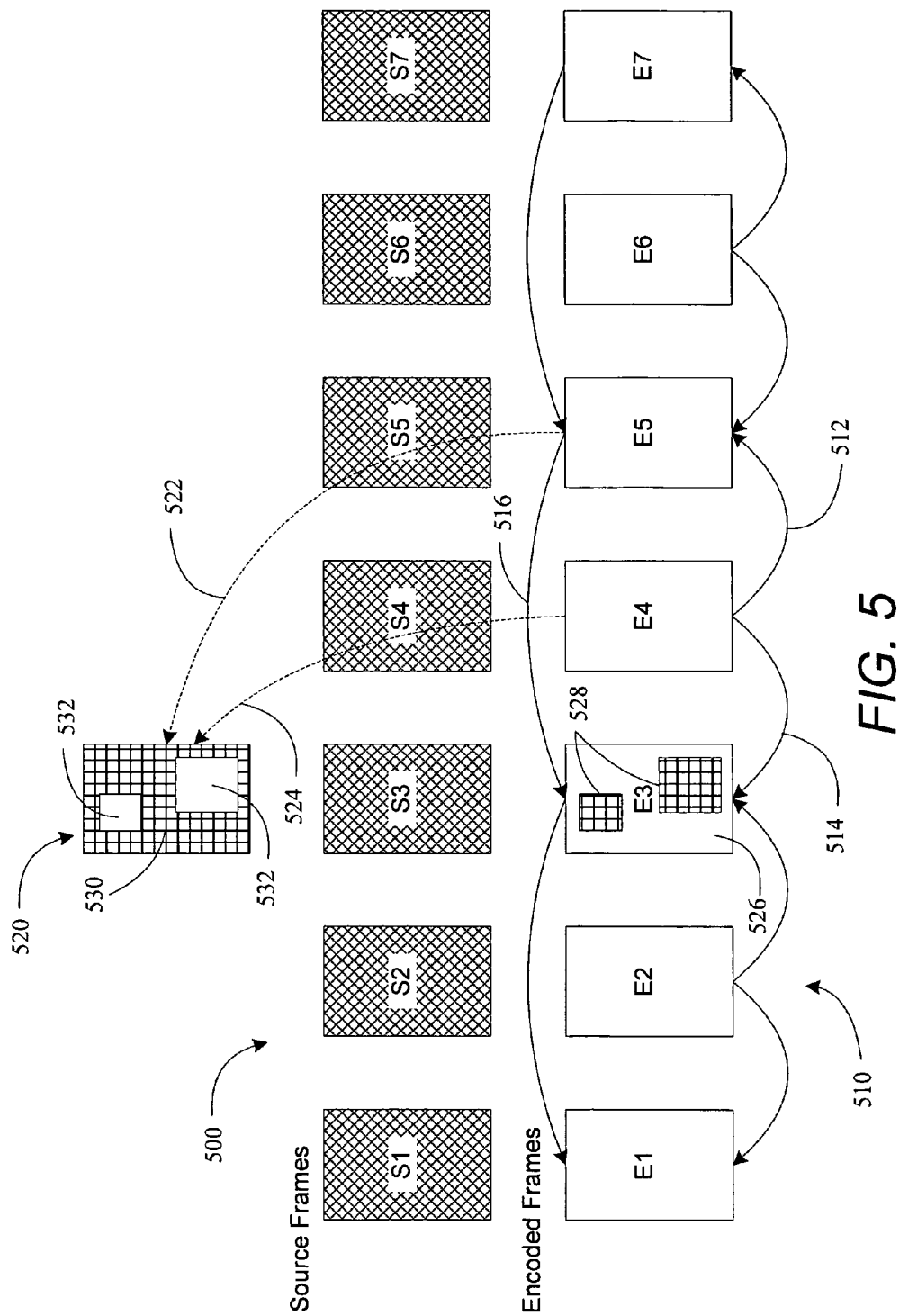
FIG. 5 graphically illustrates portions of the video stream encoded using the methods illustrated in FIGS. 3A and 3C.

FIG. 5 graphically illustrates portions of a video stream encoded using the methods illustrated in FIG. 3A and particularly FIG. 3C. The example illustrates a portion of a source video sequence 500 comprising source frames labeled S1 through S7. The source sequence 500 represents the multimedia data that the encoder device performing the method 200 of FIG. 3C is compressing. The example also contains an encoded sequence 510 comprising encoded frames labeled E1 through E7. As discussed above in reference to FIG. 4, the encoded sequence 510 includes I-frames, P-frames and B-frames. The P-frames and B-frames are predicted from portions of other frames in the sequence 510 as indicated by the arrows 512, 514 and 516. In this example, the frame E3 represents the first version of the multimedia data encoded at block 214. The frame E3 comprises the inter-coded first portion of the frame depicted by a section labeled 526. The frame E3 also comprises two intra-coded portions labeled 528.

The encoded frame sequence 510 can be decoded normally when all reference frames, upon which inter-coded portions depend, are received. Errors introduced during transmission across a network or switching to a new video channel can hinder or render impossible, the decoding of inter-coded portions. A switch frame 520 is used to enable resynchronization of the encoded sequence 510. The switch frame 520 is the second version of the multimedia data encoded at block 216 in the method of FIG. 3C. In this example, switch frame 520 comprises one or more intra-coded portions 530 which can be decoded independently. A decoder device can determine if reference data is available for decoding encoded frame E3, and if reference data is available, frame 520 can be discarded. If however, reference data upon which frame E3 depends is missing, then the intra-coded section 530 of the switch frame 520 can be decoded instead of the corresponding inter-coded section 526 of the encoded frame E3. The intra-coded portions 528 of the encoded frame E3 can also be decoded independently and combined with the decoded section 530 of the switch frame 520 to form a complete decoded frame.

Frames subsequent to the frame formed by combining intra-coded portions 528 and 530 in the encoded sequence 410 that depended upon frame E3 can be decoded in reference to the combined portions 528 and 530. For example, encoded frame E5 is a P-frame that depended upon frame E3 as indicated by the arrow 416. Frame E5 can be decoded by referencing the decoded switch portion 530, as indicated by the arrow 522, and by referencing the decoded portions 528 from fame E3, as indicated by the arrow 516. Similarly, B-frame E4 can be decoded by referencing the decoded switch portion 530, as indicated by the arrow 524, and the decoded portions 528 from fame E3, as indicated by the arrow 514, and also referencing the already decoded frame E5 as indicated by the arrow 512. After decoding the frames in the encoded sequence 510 that depend upon frame E3 (where they are decoded in reference to the switch portion 530 and/or the intra-coded portions 528 in this example), the remaining frames in the sequence 510 can be decoded in the normal manner. The switch frame is encoded such that subsequent frames do not include a reference to any frame preceding the switch frame.

The switch frame 520 also contains sections 532 corresponding to the sections 528 in the encoded frame E3. The sections 532 can be left un-encoded at block 216 where the second version of multimedia data is generated. However, this would not be compliant with standards such as H.26x and MPEGx. In one example, the intra-coded portions 528 of frame E3 can be encoded coarsely while the collocated portions 532 of the switch frame 520 can be encoded finely. In this way, the encoded frame E3 can still be encoded with a fewer number of bits. In this example the coarsely coded portions 528 in the frame E3 can be replaced with the finely encoded portions 532. In another example, the intra-coded portions 528 can be encoded finely while the collocated portions 532 of the switch frame 520 can be encoded coarsely. In this way, the switch frame 520 can be encoded with a fewer number of bits. In this example the coarsely coded portions 532 in the switch frame 520 can be replaced with the finely encoded portions 528 of the encoded frame E3. In both of these examples, in one aspect, the coarsely coded sections may be intra-coded or inter-coded in a way that uses the fewest number of bits to represent all of the image area and set all the coefficient values to zero. This will reduce the number of bits needed and still allow the both the switch frame 520 and the encoded frame E3 to be standard compliant.

In order for the intra-coded portions 528 of this example to be truly independently decodable, they should be intra-coded in a way that does not depend on the inter-coded portions 526 in the frame E3. For example, some intra-coding utilizes spatial prediction which depends on neighboring blocks of pixels. If the inter-coded portion 526 depends on another frame, which may not be available due to errors or due to a channel switch condition, then the portions 526 may not be decodable, and, therefore, any intra-coded portion 528 that depends on the portions 526 will also not be properly decodable.

Figure 3D:
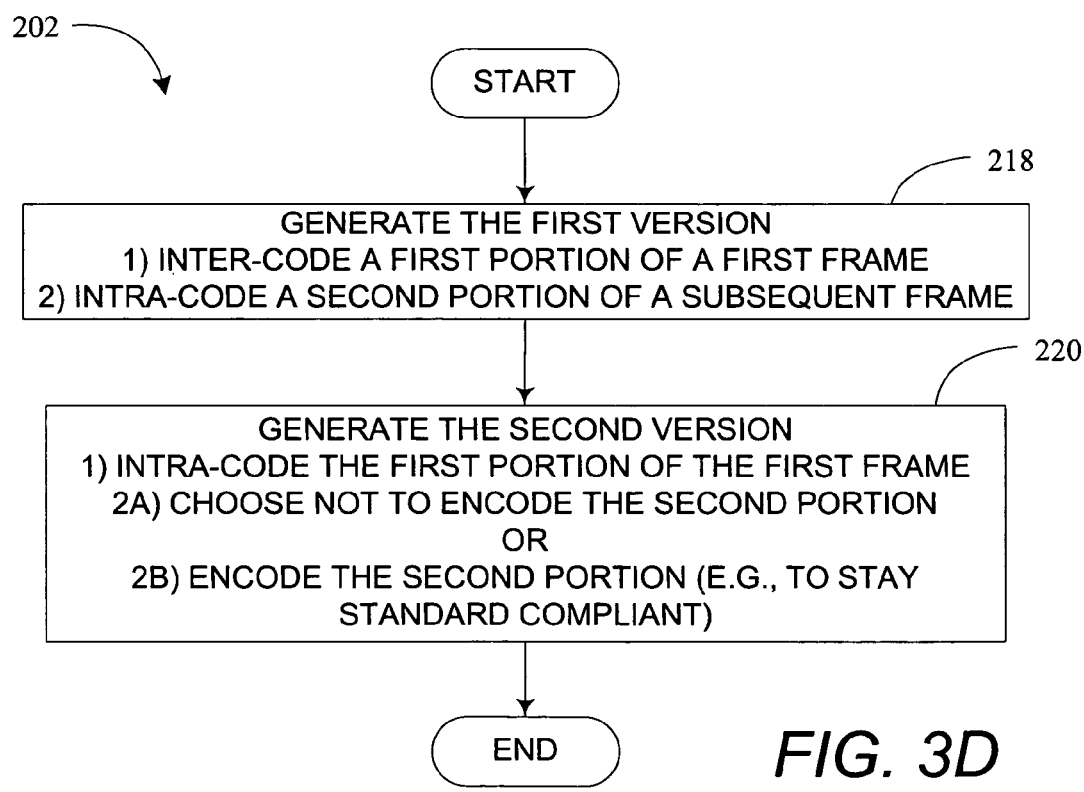
FIG. 3D is a flowchart illustrating in more detail another example of block 202 of the method illustrated in FIG. 3A.

FIG. 3D is a flowchart illustrating in more detail another example of block 202 of the method illustrated in FIG. 3A. In particular, the block 202 of FIG. 3A is shown comprising two blocks 218 and 220. At block 218, the first version of multimedia data is generated by the encoder device using inter-coding for a first portion of a first frame. Inter-coding can be motion compensated prediction. The inter-coding encoder 118 in FIG. 2A can perform the inter-coding at block 218. One or more second portions of the first frame can be encoded by inter-coding and/or intra-coding, but the type of encoding of the second portions of the first frame is not critical in this example. Also at block 218, the one or more second portions are intra-encoded in one or more subsequent frames in the video frame sequence. The intra-coding encoder 120 can perform the intra-coding at block 218.

At block 220, the second version of multimedia data is generated by the encoder device using intra-coding for the first portion of the switch frame. Thus the second version of the first portion of the switch frame can be independently decoded, thereby enabling acquisition and/or resynchronization of at least the first portion. The intra-coding encoder 120 of FIG. 2A can perform the intra-coding at block 220. The encoder device can choose not to encode the one or more second portions of the switch frame since intra-coded versions are available to the decoder in the subsequent frames of the first version encoded at block 214. However, the encoder may choose to encode the one or more second portions in order to, for example, maintain compliance with a standard where each region of a frame needs to be encoded. In some embodiments, the encoder may choose to encode the one or more second portions of the switch frame using the least amount of bits possible. This may be achieved by encoding with as coarse a quantization method as is available, thus using the least amount of bits to represent the intra-coded coefficients. Other methods of encoding the second portion known to those in the art can also be used. A detailed example using the method of FIG. 3D is now discussed.

Figure 6:
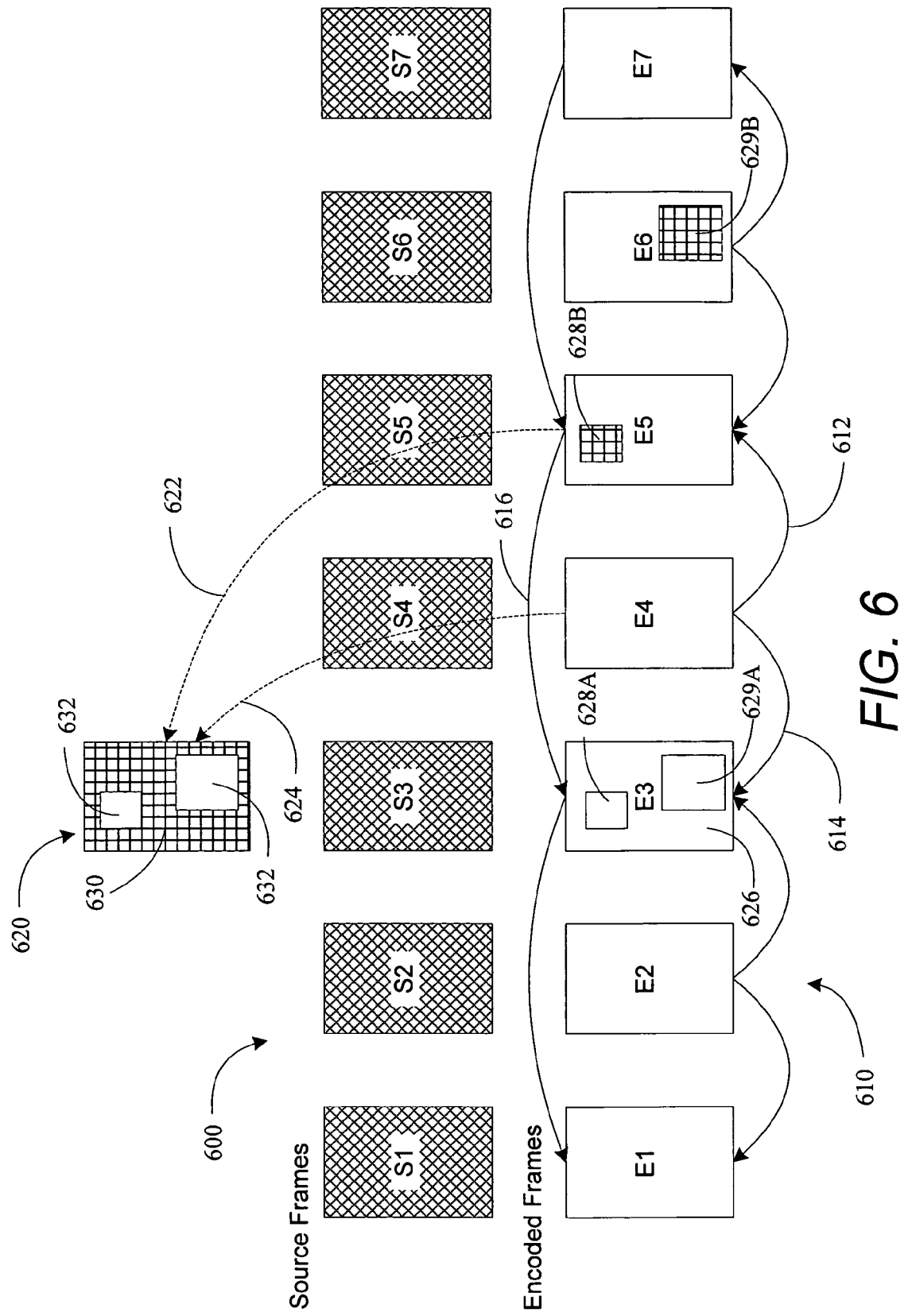
FIG. 6 graphically illustrates portions of the video stream encoded using methods illustrated in FIGS. 3A and 3D.

FIG. 6 graphically illustrates portions of a video stream encoded using the methods illustrated in FIG. 3A and particularly FIG. 3D. The example illustrates a portion of a source video sequence 600 comprising source frames labeled S1 through S7. The source sequence 600 represents the multimedia data that the encoder device performing the method 200 of FIG. 3D is compressing. The example also contains an encoded sequence 610 comprising encoded frames labeled E1 through E7. As discussed above in reference to FIG. 4, the encoded sequence 610 includes I-frames, P-frames and B-frames. The P-frames and B-frames are predicted from portions of other frames in the sequence 610 as indicated by the arrows 612, 614 and 616. In this example, the frame E3 represents the first version of the multimedia data encoded at block 218. The frame E3 comprises the inter-coded first portion of the first version encoded at block 218, depicted by a section labeled 626. The frame E3 also comprises two second portions labeled 628A and 629A. For this example, the second portions 628A and 629A are inter-coded.

The encoded frame sequence 610 also contains frames E5 and E6 which, in this example, include intra-coded portions 628B and 629B, respectively. The intra-coded portions 628B and 629B represent the second portions that are intra-coded at block 218. The portions 628B and 629B are co-located in corresponding regions of their respective frames with the portions 628A and 628B in the frame E3.

The encoded frame sequence 610 can be decoded normally when all reference frames, upon which inter-coded portions depend, are received. Errors introduced during transmission across a network or switching to a new video channel can hinder or render impossible, the decoding of inter-coded portions. A switch frame 620 can be used to enable resynchronization of the encoded sequence 610. The switch frame 620 comprises the second version of the multimedia data encoded at block 220 in the method of FIG. 3D. In this example, the first version in the switch frame 620 comprises one or more intra-coded portions 630 which can be decoded independently. The portion 630 is co-located in regions of the frame with the inter-coded portion 626 in frame E3. A decoder device can determine if reference data is available for decoding encoded frame E3, and if reference data is available, frame 620 can be discarded. If however, reference data upon which frame E3 depends is missing, then the intra-coded section 630 of the switch frame 620 can be decoded instead of the corresponding inter-coded section 626 of the encoded frame E3. The inter-coded portions 628A and 629A of the encoded frame E3 may not be able to be decoded if the reference data upon which they depend is also unavailable to the decoder device. In this situation, the decoding of the regions of the frame corresponding to portions 628A and 629A can be delayed or concealed (e.g., replaced) with the later received intra-coded regions 628B and 629B of frames E5 and E6 which can be decoded independently and, in this example, be combined with the decoded section 630 of the switch frame 620 to form a complete decoded frame. In another example the encoded portions 632 of the switch frame 620 can be decoded and displayed with the intra-coded portion 630 of the switch frame 620.

Inter-coded portions of frames subsequent to the frame E3 and the switch frame 620 can be decoded in reference to sections 630 and 632. The inter-coded portions that reference the sections 632 may exhibit some error since the sections 632 may not have the same image quality as the sections 628A and 629A which the sections 632 replaced. However, since the sections 628B and 629B are in co-located sections of frames E5 and E6, the degraded images will be displayed for a short duration of time, lasting only as long as the time for 3 frames to be displayed. If the frame rate is thirty frames per second, then the 3 frames take only one tenth of a second to display.

After decoding the frames in the encoded sequence 610 that depend upon frame E3 (where they are decoded in reference to the switch frame 620 in this example), the remaining frames in the sequence 610 can be decoded in the normal manner. In another example where a channel switch condition has occurred and the switch frame 620 is the first frame to be displayed, the display of the frame can be delayed until all the intra-coded sections 630, 628B and 629B are available. In this situation, the inter-coded sections of frames E4 and E5 can be decoded in reference to the switch frame 620 and then be used as reference data for other frames in the encoded sequence 610, but not necessarily displayed. Display of the first acquired frame can be delayed until frame E6 is decoded.

As discussed above in reference to sections 532 of FIG. 5, the sections 632 can be left un-encoded at block 220 where the second version of multimedia data is generated. However, this would not be compliant with standards such as H.26x and MPEGx. In one example, the portions 628A and 629A can be encoded coarsely while the collocated portions 632 of the switch frame 520 can be encoded finely. In this way, the encoded frame E3 can still be encoded with a fewer number of bits. In this example the coarsely coded portions 628A and 629A in the frame E3 can be replaced with the finely encoded portions 632. In another example, the intra-coded portions 628B and 629B can be encoded finely while the collocated portions 632 of the switch frame 620 can be encoded coarsely. In this way, the switch frame 620 can be encoded with a fewer number of bits. In this example the coarsely coded portions 632 in the switch frame 620 can be replaced with the finely encoded portions 628B and 629B of the encoded frames E5 and E6, respectively. In both of these examples, in one aspect, the coarsely coded sections may be intra-coded or inter-coded in a way that uses the fewest number of bits to represent all of the image area and set all the coefficient values to zero. This will reduce the number of bits needed and still allow both the switch frame 620 and the encoded frame E3 to be standard compliant. In the case of using inter-coded portions 632 in the switch frame 620, some form of spatial error concealment may be used by a decoder device to cover up the inter-coded portions if such inter-coded portions are not decodable without reference data. In order to prevent propagation of errors introduced due to inter-coded portions at frame E5 referencing lower quality regions of the switch frame 620, for example, the intra-coded portions 628B and 629B of this example can be intra-coded in a way that does not depend on the inter-coded portions of their respective frames E5 and E6.

The encoding methods of FIGS. 3A, 3B, 3C and 3D are examples of methods to encode a channel switch frame with can be used to stop error propagation and to enable efficient channel switching. Frequent occurrences of the channel switch frames are desirable for both stopping error propagation and for enabling quick channel switching or acquisition. It is known that a channel switch delay of two seconds or less improves overall user experience.

In one example, a channel switch frame is encoded at least once every second and is associated with a group of frames referred to as a superframe, where a superframe lasts one second. If the frame rate is 30 frames per second, a super frame would include 30 frames. However, a superframe can also comprise any number of frames and/or any length of time. For example, a superframe may comprise N frames where N is an integer in a range from about 1 to about 100, or more. In one aspect, the switch frame is located at the beginning of a superframe. In another aspect, if an encoder determines a frame within a superframe is to be intra-coded (e.g., in the case of a scene change), then this frame can be designated as the switch frame. An encoder may limit a superframe to have only one switch frame, or multiple switch frames may be encoded in one superframe. In order for a switch frame to stop error propagation, it can be encoded as an IDR (instantaneous decoding refresh) picture, where no subsequent frames in the sequence reference frames prior to the switch frame in the sequence. Thus, the frames after the switch frame can be decoded independently from the frames in front of the switch frame.

In another example, where the encoder determines that an I-frame is not needed (e.g., for scene-change reasons) within a superframe, an extra or redundant frame is encoded as the switch frame. This redundant switch frame can be the first frame in the superframe. In some examples, the switch frame can be located at a position in the sequence of frames where a P-frame or B-frame containing a larger percentage of intra-coded portions (e.g., using the methods depicted in FIGS. 3C and 3D).

In another example, the switch frame is collocated with the first P-frame of a superframe. In one aspect, the first inter-coded P-frame and/or B-frame of a superframe can be encoded in reference to a frame in another superframe, while all other inter-coded frames in the superframe are encoded so as not to reference data in other superframes. This methodology enables high operational efficiency in the decoding of the video sequence whether or not there is a channel switch in effect and/or there are errors in the previous superframe. When there is no channel switch event or error detected, it is often advantageous to only decode and display the inter-coded first version and to discard the switch frame. Displaying an intra-coded frame every second can lead to a pulsating effect of the displayed video. Details of this method of encoding and related decoding methods are discussed below in reference to FIG. 8 as they relate to an example of scalable coding with base and enhancement layers. Decoding methods associated with the encoded switch frame discussed above will now be discussed.

Switch Frame Decoding Method

Figure 7A:
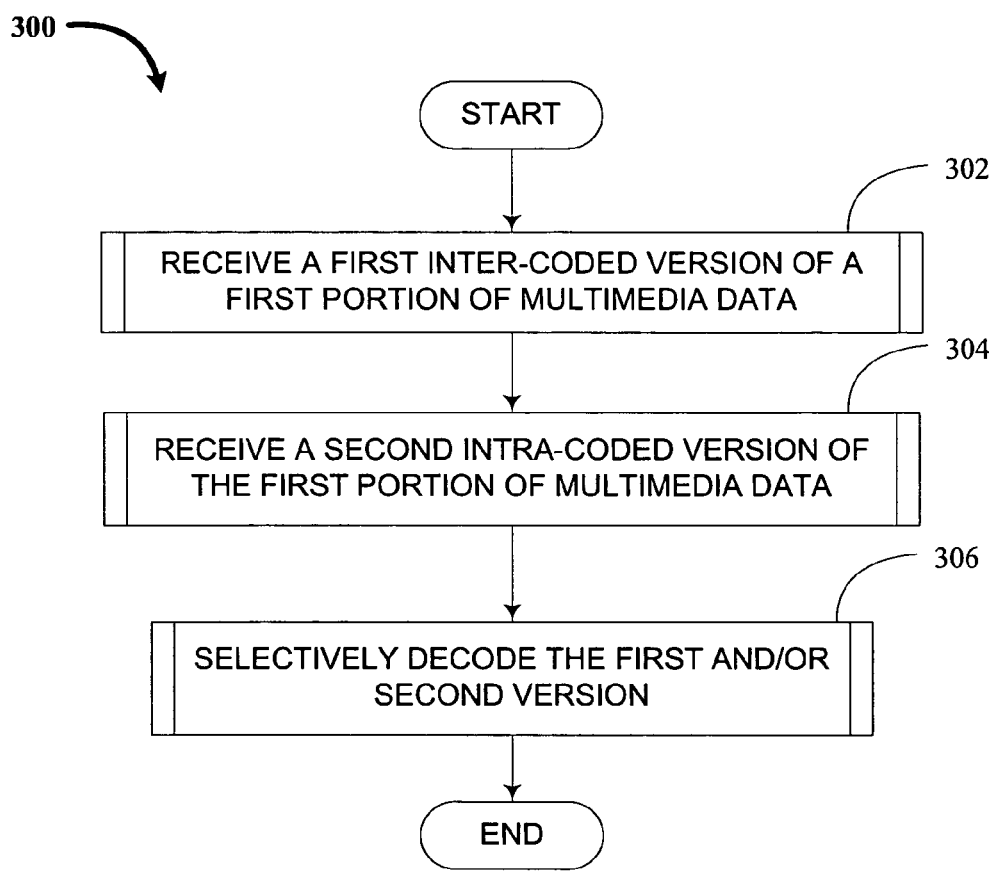
FIG. 7A is a flowchart illustrating one example of a method of decoding a portion of a video stream in a system such as illustrated in FIG. 1.

FIG. 7A is a flowchart illustrating one example of a method 300 of decoding a portion of a video stream in a system such as illustrated in FIG. 1. A decoder device such as the decoder device 150 in FIGS. 1 and 2B can perform all or part of the method 300. At block 302 the decoder device receives a first version of a first portion of multimedia data. In this example, the first version is an inter-coded version such as is generated by the inter-coding encoder element 118 of the encoder device 110 in FIG. 2A. The inter-coded first version may comprise a whole frame of multimedia data or a partial frame such as a plurality of macroblocks, and/or subblocks.

Proceeding to block 304, the decoder device receives a second version of the first portion of multimedia data. In this example, the second version is an intra-coded version of the first portion of multimedia data such as is generated by the intra-coding encoder element 120 illustrated in FIG. 2A. The second version may comprise a whole frame of multimedia data or a partial frame such as a plurality of macroblocks and/or subblocks. The second version is the switch frame as was encoded by a method such as the example methods illustrated in FIGS. 3A, 3B, 3C and 3D. The receiver element 158 of the decoder device 150 illustrated in FIG. 2B can perform the receiving acts of blocks 302 and 304.

After receiving the first inter-coded version and the second intra-coded version of the first portion of multimedia data, the decoder device selectively decodes the first and/or second version at block 306. In a normal decoding mode, the decoder device can successfully decode the first inter-coded version received at block 302. In this case, the second version received at block 304 can be discarded. However, in some situations, the decoder may not be able to decode some or all of the first version of inter-coded data (e.g., after a user's channel switch request), and the decoder device can selectively decode some or all of the second version of intra-coded multimedia data. The selective decoder element 160 of FIG. 2B can be used to perform the selective decoding acts of block 306.

Figure 7B:
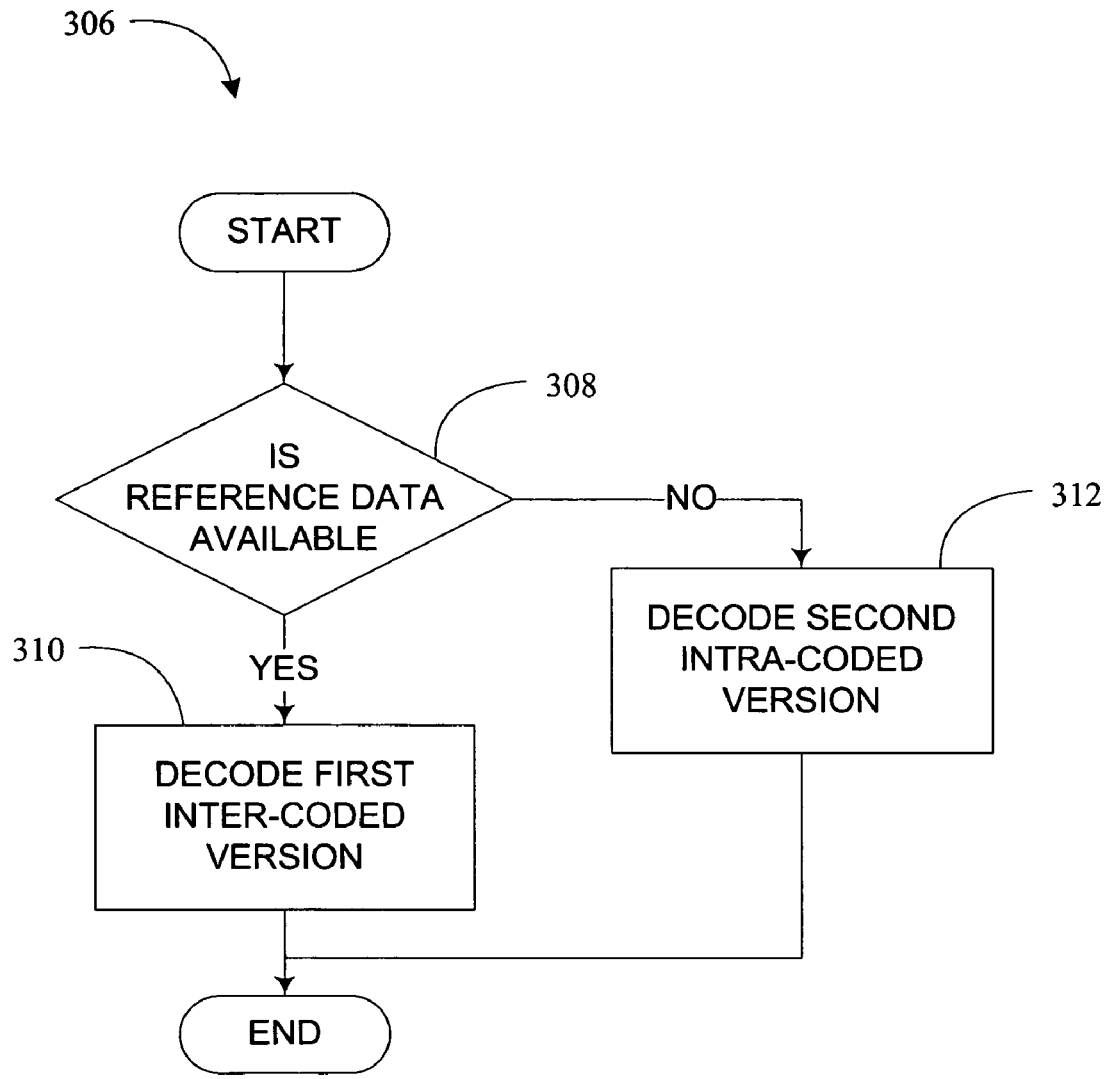
FIG. 7B is a flowchart illustrating in more detail an example of a portion of the method illustrated in FIG. 7A.

FIG. 7B is a flowchart illustrating in more detail an example of a portion of the method illustrated in FIG. 7A. Specifically, an example of a method of performing the selective decoding acts of block 306 is shown. The decoder device determines, at decision block 308, whether reference data upon which the first inter-coded version depends is available. If the reference data is available, then the method proceeds to block 310 and the decoder device decodes the first inter-coded version of multimedia data. The decoder device may discard the second version of intra-coded data if the inter-coded first version is successfully decoded. If reference data is not available, such as when the user requests a channel switch, the method proceeds to block 312 and the decoder device decodes the second intra-coded version.

In one aspect, the decoder device can operate in a channel switch mode with the decoder device performing an initial acquisition of the video stream being received. In this mode, the decoder device can selectively decode the second version of the first portion of multimedia data at block 312. Since the second version is intra-coded data, the decoder device can decode it without any reference data from other frames. The first version of inter-coded data may not be decodable in this channel switch condition since it may depend on reference multimedia data that is unavailable for decoding. The channel switch detector 164 of the decoder device 150 in FIG. 2B can detect a channel switch command and thus, cause the decoder device to look for the next switch frame.

In another aspect, the decoder device may detect errors in the reference data using the error detector 166 shown in FIG. 2B. The error detector 166 is configured to perform one or more of various error detection and/or correction schemes. Encoded data may include various schemes to provide for error resiliency. Error prone channels such as wireless and/or wired networks may introduce errors into the bitstream received by decoder. Such error resiliency schemes may include one or more error control coding schemes, interleaving schemes and other schemes that are known to those of skill in the art. The error detector 166 includes corresponding error decoding components that enable detection and correction of errors. Some errors that are introduced over networks may not be correctable by the error detector 166. For those errors that are not correctable, the decoder device determines which inter-coded multimedia data depends on the erroneous data and determines, at decision block 308, that the reference data is not available. The decoder device then looks for the next intra-coded version of the multimedia data so as to stop the propagation of error caused by the erroneous data.

The decoder device may determine, at decision block 308, if reference data is available on a frame level, a slice level, a macroblock level and/or a subblock level. For example, a decoder device may determine whether all the reference data is available for an entire frame and decide to decode the second version if all of the reference data is not available. Similar decoding decisions may be made for individual slices (groups of one or more macroblocks), for individual macroblocks and/or individual subblocks. The reference data determiner element 162 of the decoder device 150 in FIG. 2B can perform the acts at decision block 308.

FIG. 7C is a flowchart illustrating in more detail another example of a portion of the method 300 illustrated in FIG. 7A.

The example method 300 illustrated in FIG. 7C can be used to decode a portion of video data that was encoded as in the method shown in FIG. 3D and depicted graphically in FIG. 6. Referring to FIG. 6 and FIG. 7C, the method 300 starts at block 302 where the decoder device receives a first inter-coded version of a first portion of a first frame of multimedia data such as the section 626 of the encoded frame E3. In this example, the section 626 is located in a first frame of a superframe of multimedia data. However, this is an optional feature and the frame can be in any portion of a superframe, or in any location of a video sequence in general. Proceeding to block 304, the decoder device receives a second intra-coded version of the first portion of the first frame, such as the section 630 of the switch frame 620 shown in FIG. 6. In one aspect, the first portion of the first frame excludes one or more second portions of the first frame, such as the sections 628A, 628B in the encoded frame E3 and the sections 632 in the switch frame 620. As discussed above in reference to FIG. 6, these second portions may be intra-coded or inter-coded in the encoded frame E3 and intra-coded in the switch frame 620.

Continuing to block 314, the decoder device receives intra-coded versions of the one or more second portions in one or more other frames of the superframe, such as the portions 628B and 629B in frames E5 and E6 respectively. These intra-coded portions are encoded so as to not depend on any of the inter-coded portions of the frames they are located in, as discussed above. The independently decodable second intra-coded portions serve to limit error propagation and/or to initially acquire and/or re-acquire the encoded video sequence 610 shown in FIG. 6. The receiver element 158 shown in FIG. 2B can perform the receiving acts of blocks 302, 304 and 314.

After receiving the first and second versions of the first portion and the intra-coded versions of the second portions, the process 300 continues at the selective decoding block 306. In the example method 300 shown in FIG. 7C the selective decoding block 306 comprises the decision block 308, and decoding blocks 310 and 316. The decision block 308 functions in the same way as it did in FIG. 7B. If the reference data upon which the intercoded first version of the first portion depends is available, then the intercoded first portion 626 is decoded at block 310. If some or all of the reference data is not available, due to errors and/or initial acquisition of the encoded frame sequence 610, the decoder device decodes the second intra-coded version of the first portion (section 630 in FIG. 6) and decodes the intra-coded second portions 628B and 629B in frames E5 and E6 respectively. In one aspect, the decoder also receives the portions 632 of the switch frame 620 and decodes these portions as well. The intra-coded portion 630 of the switch frame 620 and the intra-coded portions 628B and 629B of frames E5 and E6 combine for form a complete intra-coded image of the whole frame. Other portions of other frames in the encoded sequence 610 that depend on the encoded frame E3 are then decoded in reference to the decoded portions of the switch frame 620 as discussed above (see frames E4 and E5 and the prediction arrows 622 and 624 in FIG. 6). Thus, the entire frame is intra-coded at least once in either the switch frame 620 and/or the frames E5 and E6 in this example. This serves to enable acquisition of the encoded sequence 610 and limits error propagation. The reference data determiner element 162 in FIG. 2B can determine if the reference data is available at the decision block 308. The selective decoder element 160 can perform the decoding acts at blocks 310 and 316.

Figure 7D:
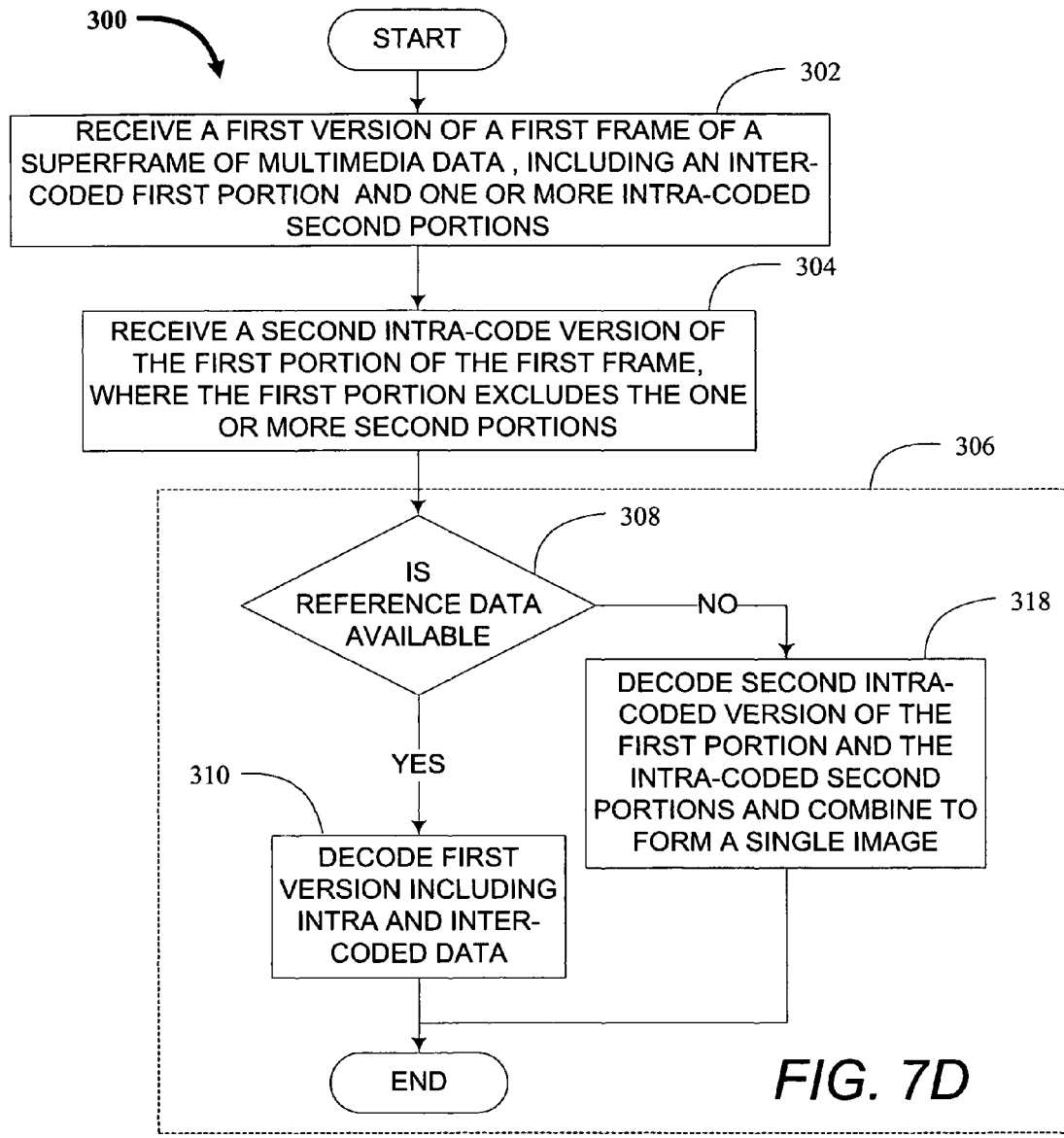
FIG. 7D is a flowchart illustrating in more detail another example of a portion of the method illustrated in FIG. 7A.

FIG. 7D is a flowchart illustrating in more detail another example of a portion of the method 300 illustrated in FIG. 7A.

The example method 300 illustrated in FIG. 7D can be used to decode a portion of video data that was encoded as in the method shown in FIG. 3C and depicted graphically in FIG. 5. Referring to FIG. 5 and FIG. 7D, the method 300 starts at block 302 where the decoder device receives a first version of a first frame E3 of a superframe. The first version of the first frame E3 includes an inter-coded first portion 526 and one or more intra-coded second portions 528. In this example, the section 526 and sections 528 are in a first frame of a superframe of multimedia data. However, this is an optional feature and the frame can be in any portion of a superframe, or in any location of a video sequence in general. Proceeding to block 304, the decoder device receives a second intra-coded version of the first portion of the first frame, such as the section 530 of the switch frame 520 shown in FIG. 5. In one aspect, the second version of the first portion of the first frame excludes the one or more second portions that are intra-coded in the other frames, such as the sections 628B, 629B in the encoded frame E5 and E6 and the sections 632 in the switch frame 620. As discussed above in reference to FIG. 6, these second portions may also be intra-coded in the switch frame 620.

After receiving the first and second versions of the first portion and the intra-coded version of the second portions, the process 300 continues at the selective decoding block 306. In the example method 300, shown in FIG. 7D, the selective decoding block 306 comprises the decision block 308, and decoding blocks 310 and 318. The decision block 308 functions in substantially the same way as it did in FIGS. 7B and 7C. If the reference data upon which the inter-coded first version of the first portion depends is available, then the inter-coded first portion 526 is decoded at block 310. If some or all of the reference data is not available, due to errors and/or initial acquisition of the encoded frame sequence 510, the decoder device decodes the second intra-coded version of the first portion (see section 530 in FIG. 5) and decodes the intra-coded second portions 528 in frame E3. In one aspect, the decoder also receives the portions 532 of the switch frame 520 and decodes these portions or discards them. In one example, the sections 532 of the switch frame 520 are encoded with the minimum number of bits to maintain compliance with a standard as discussed above. The intra-coded portion 530 of the switch frame 520 and the intra-coded portions 528 of frame E3 combine for form a complete intra-coded image of the whole frame. Other portions of other frames in the encoded sequence 510 that depend on the encoded frame E3 are then decoded in reference to the decoded portions 530 of the switch frame 520 (and possibly the portions 532 if they were decoded) and the decoded portions 528 of the frame E3 as discussed above (see frames E4 and E5 and the prediction arrows 522, 524, 514 and 516 in FIG. 6). Thus, the entire frame is intra-coded at least once in either the switch frame 620 and/or the frame E3 in this example. This serves to enable acquisition of the encoded sequence 510 and limits error propagation. The reference data determiner element 162 in FIG. 2B can determine if the reference data is available at the decision block 308. The selective decoder element 160 can perform the decoding acts at blocks 310 and 318.

In some examples, the decoder device receives the first inter-coded version (and optionally any intra-coded portions as illustrated in FIGS. 5 and 6) over a first communication link and receives the second intra-coded switch frame versions over a second communication link. Either or both of these communication links may comprise a virtual channel such as defined by packet header information, etc. In some examples, the first inter-coded versions and the second intra-coded versions are received over the same communication link. An example of a pair of virtual channels that can be used to transmit and/or receive the first inter-coded and second intra-coded versions are a base layer and an enhancement layer of a scalable communication system.

Switch Frame Methods Utilizing Base and Enhancement Layers

In some examples, a multimedia bitstream targeted to a single application, such as a video bitstream for example, can be encoded into two or more separate layers (e.g., using scalable coding) such as a base layer and an enhancement layer. These layers can then be used to provide scalability, e.g., temporal and/or SNR (signal to noise ratio) scalability. One example of scalable coding, divides Intra-coded pictures (such as I frames) and the different inter-coded pictures (such as P frames or B frames derived using, e.g., motion compensated prediction) into different layers in the bitstream. I frames may be encoded in a base layer and P and/or B frames may be encoded in an enhancement layer. Scalable coding, is useful in dynamic channels, where scalable bitstreams can be adapted to match fluctuations in network bandwidth. In error-prone channels, scalable coding can add robustness through unequal error protection of the base layer and the enhancement layer. Better error protection can be applied to the more important layer. Scalable coding can also be used for providing a switch frame to limit error propagation and enable efficient channel acquisition.

Figure 8A:
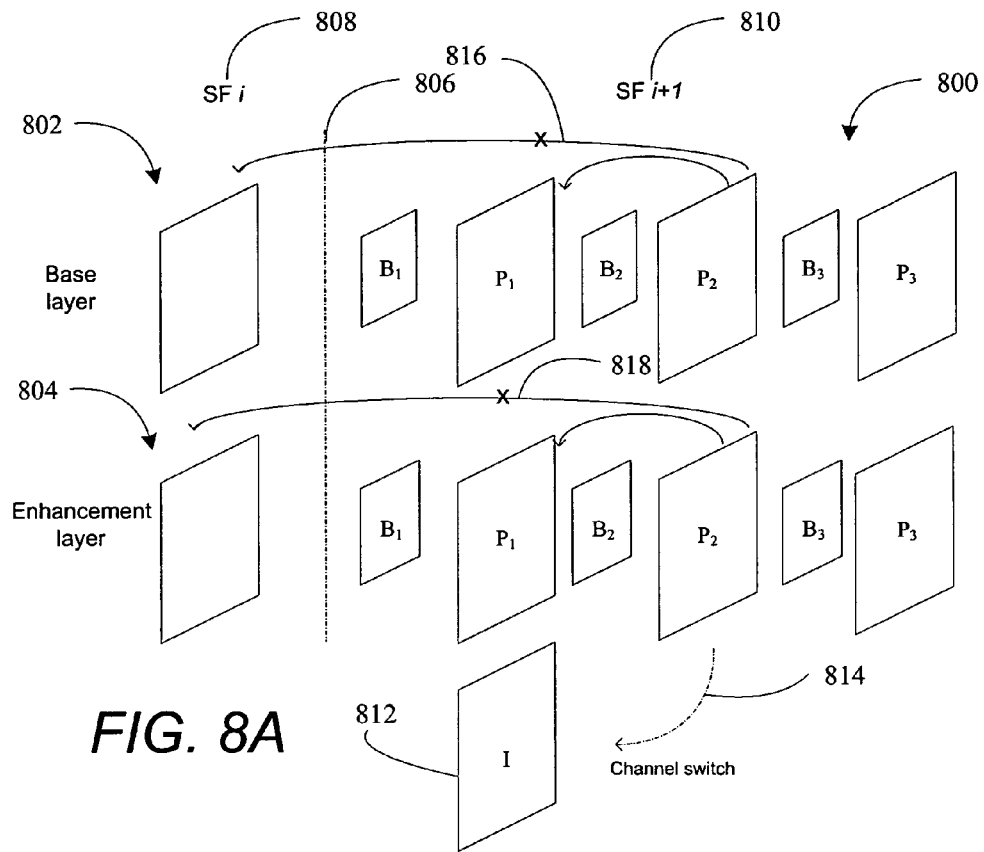
FIGS. 8A and 8B graphically illustrate portions of a scalable video stream decoded using the methods illustrated in FIG. 7.

FIG. 8A graphically illustrates an example of a portion of the method illustrated in FIG. 7. A multimedia bitstream 800 comprises a base layer 802 and an enhancement layer 804. The portion of the multimedia bitstream 800 depicted comprises P frames and B frames (e.g., predicted using unidirectional and/or bidirectional motion compensated prediction). In one aspect of this example, the base layer data contains video of a certain quality level for the P frames, B frames and I frames (not shown), while the enhancement layer data contains a refinement to the base layer data. The P frames and B frames are predicted from other frames in the video sequence (e.g., B frames predicted from a prior frame and a subsequent frame and P frames predicted from a prior frame). The portion of the video bitstream 800 is on a border 806 separating a first superframe SF i (see 808) and a second superframe SF i+1 (see 810). In this example the first frame of the second superframe 810 is a B frame B1 and the second frame is a P frame P1. The B frame B1 can be assumed to be predicted from the last frame of the first superframe 808 and the P frame P1 in the second superframe.

The multimedia bitstream 800 also includes a switch frame 812 intra-coded as an I frame. However, the switch frame 812 can be any of the switch frames as discussed above in reference to FIGS. 3, 4, 5 and 6. In some examples, the switch frame 812 is transmitted and received on a different channel, actual or virtual, than the base and enhancement layer data. The switch frame 812 can be transmitted and received in a sideband message. For example, the switch frame 812 may be transmitted and received in one or more Supplemental Enhancement Information (SEI) messages of H.264 or user_data messages of MPEG-2.

When a decoder receiving the multimedia bitstream 800 has successfully decoded the first superframe 808, the B frames and P frames of the base layer 802 and the enhancement layer 804 can be decoded normally in reference to the frames they were predicted from in the encoded process. The switch frame 812 can be discarded if the reference data for the P and B frames is available. However, if the decoder has received erroneous data in the first super frame 808 or a channel switch request during the first superframe 808, then the decoder may determine that it should use the switch frame 812. In this case, the B frames B1 and the P frames P1 in the base and enhancement layers are discarded or partially discarded as discussed above in reference to FIGS. 5, 6 and 7. The switch frame is then decoded and the subsequent P frame P2 is decoded in reference to the switch frame 812 as indicated by the dashed arrow 814. The B frame B2 can likewise be decoded in reference to the switch frame 812 and the P frame P2, for example.

In one aspect, as discussed above, the reference frames for the intercoded portions of a superframe may be restricted. For example, the first B frame B1 and the first P frame P1 of the second superframe 810 may be predicted from a frame in another super frame such as the first superframe 808. Since the switch frame 812 is available to replace P1, and since frame B1 can be dropped (assuming that nothing subsequent to B1 was predicted from B1, which is a common rule for B frames), encoding the frames B1 and P1 by predicting from the first superframe 808 will not cause error propagation. However, other interceded portions of the second superframe are restricted, in this aspect, from being predicted from another superframe, or any other frame preceding the switch frame 812, as indicated by the crossed-out arrows 816 and 818. Restricting the reference frames may impact the coding efficiency of the frames B2, P2 and other subsequent frames in the superframe 810. For example, frames B2 and P2 can only use P1 as a forward reference, while P3 and B3 can use both P1 and P2 as forward reference, thus giving a higher likelihood of finding a better matching block of multimedia data. The further away from the superframe boundary 806, the less the impact will be. So P2 and B2 will lose the most coding efficiency in this example.

To reduce the rate consumption of the switch frames, in one aspect, the switch frame 812 can be encoded at a lower quality level than the enhancement layer frames 804. For example, if the enhancement layer average QP (quantization parameter) is QPenh, the QP for the channel switch frame could be QPenh+6, which is a lower quality QP. The lower quality switch frame may be imperceptible to a user due to its short duration. The embodiment shown in FIG. 8A is not limited to a scalable method as shown, but could also be applied to a single-layer scheme.

Figure 8B:
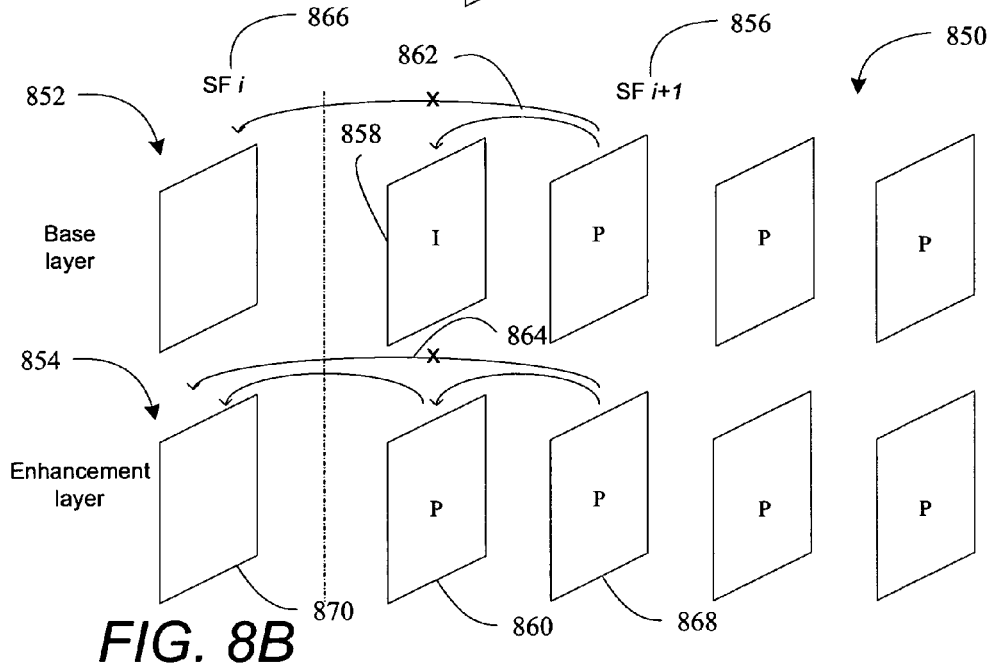

FIG. 8B graphically illustrates another example of a portion of the method illustrated in FIG. 7. A multimedia bitstream 850 comprises a base layer 852 and an enhancement layer 854. In this example, the first frame of the enhancement layer in the second superframe 856 is an intra-coded switch frame 858. In this example, the base layer P frames are encoded at a lower quality than the enhancement layer P frames. In the example video sequence 850, either the base layer quality I and P frames can be decoded, or the enhancement layer quality P frames can be decoded. For example, a decoder device may decode the lower quality base layer 852 to save battery power and may decode the higher quality enhancement layer 854 if the user desires higher quality. Generally the enhancement layer P frames are of higher quality than the base layer P and I frames.

In this example, the switch frame 858 is used when a channel switch condition is in effect and the decoder is receiving data in a first superframe 866, or when the first superframe 866 is received with erroneous reference data upon which the first P frame of the second superframe 856 depends. If either of these situations occurs, then the I frame 858 is decoded and the enhancement layer P frame 860 is discarded. In one aspect, as discussed above, the second and subsequent P frames in the second superframe 850 can be encoded without reference to frames in another superframe, such as the first superframe 866 in this example as indicated by the crossed-out arrows 862 and 864.

If the switch frame 858 is not needed (e.g., all reference data is available such as when no channel switch is requested), then the switch frame 858 may be discarded and the enhancement layer quality P frames may be decoded in the normal manner. Alternatively, if only base layer quality is to be decoded, then the enhancement layer P frames may be discarded and the base layer switch frame 858 and subsequent P frames may be decoded.

It should be noted that positions of switch frames can be at other points in a superframe or a video frame sequence in general other than the beginning as illustrated in the examples of FIGS. 8A and 8B. In some embodiments, a switch frame can be encoded at a fixed interval. The fixed interval may be in a range from about 0.5 seconds to about 2.0 seconds. In other embodiments, the switch frames may be at irregular intervals in the video sequence. For example, the encoding process may choose the location of the switch frame to coincide with an inter-coded frame with a higher percentage of intra-coded blocks as discussed above.

The examples depicted in FIGS. 8A and 8B restricted the permissible prediction frames used for frames after the first P and/or B frames in the superframe. In other examples, motion vectors of an interceded portion of a frame may be scaled from there original reference frame in another superframe to correspond to the switch frame or other frame in the current superframe. An example of motion vector scaling will now be discussed.

Referring to FIG. 8B, assume that the second P frame 868 in the second superframe 856 is predicted from the last frame 870 of the first superframe 866. If the channel switch frame 858 was decoded due to erroneous reference data or a channel switch mode, the motion vectors of P frame 868 may be scaled to correspond to the temporal location of the switch frame 858. Note that there will be some error due to non-linear motion of various image objects. The scaling of motion vectors can be characterized as follows:

$$MV\_f\_x = MV\_x * N/M; \quad (1)$$

$$MV\_f\_y = MV\_y * N/M \quad (2)$$

where MV_f_x and MV_f_y are x and y components of the new motion vector pointing to the switch frame 858, MV_x and MV_y are x and y components of the original motion vector pointing to the frame 870, N is the distance from the frame 868 to the switch frame 858, and M is the distance from the frame 868 to the original reference frame 870. In this example, N=1, and M=2, results in the MV_f_x and MV_f_y vector components being half of the original motion vectors components MV_x and MV_y. Thus the frame 868 can be estimated from the switch frame 858. Other forms of motion vector scaling using various distances N and M will be apparent to those of skill in the art.

Figure 9:
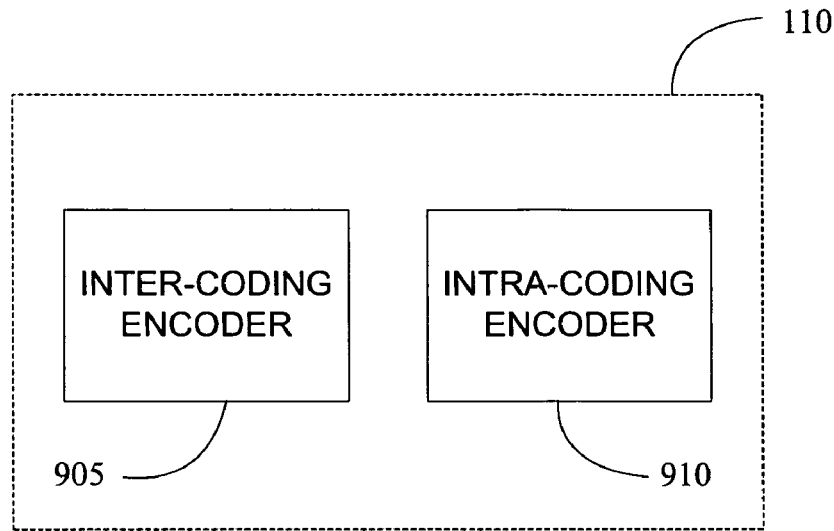
FIG. 9 is a block diagram illustrating another embodiment of an encoder device that may be used in a system such as illustrated in FIG. 1.

FIG. 9 is a block diagram illustrating another embodiment of an encoder device that may be used in a system such as illustrated in FIG. 1. The example encoder device 110 of FIG. 9 includes first encoder means for encoding a first portion of multimedia data using inter-coding to generate a first version, and second encoder means for encoding the first portion of multimedia data using intra-coding to generate a second version. The first encoder means may comprise an inter-coding decoder 905 of FIG. 9. The second encoder means may comprise an intra-coding encoder 910 of FIG. 9.

Figure 10:
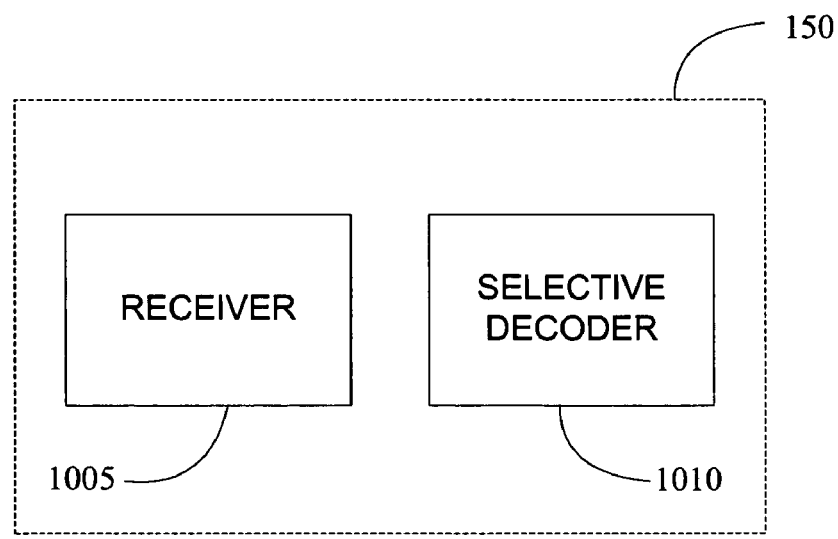
FIG. 10 is a block diagram illustrating another embodiment of a decoder device that may be used in a system such as illustrated in FIG. 1.

FIG. 10 is a block diagram illustrating another embodiment of a decoder device that may be used in a system such as illustrated in FIG. 1. The example decoder device 150 of FIG. 10 includes means for receiving a first version of a first portion of multimedia data, wherein the first version is inter-coded, and receiving a second version of the first portion of multimedia data, wherein the second version is intra-coded. The decoder device 150 further includes means for selectively decoding the first and second received versions. The means for receiving may comprise a receiver 1005 of FIG. 10. The means for selectively decoding may comprise a selective decoder 1010 of FIG. 10.

Figure 11:
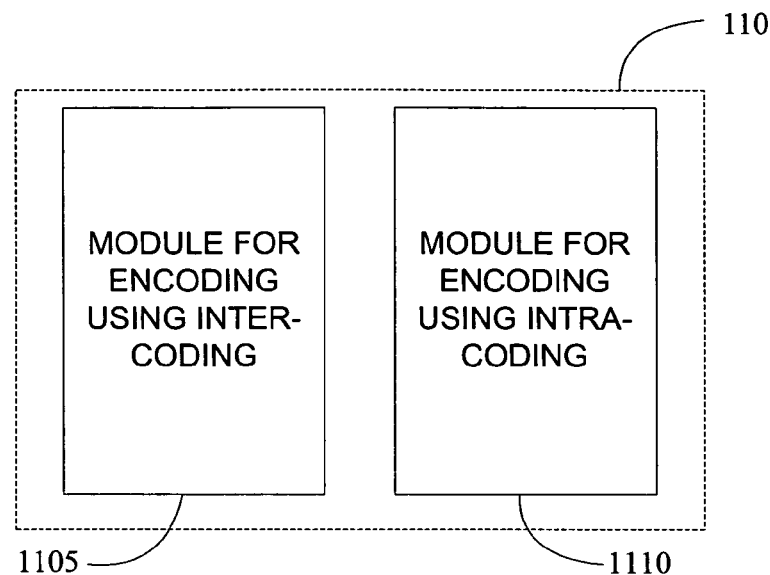
FIG. 11 is a block diagram illustrating another embodiment of an encoder device that may be used in a system such as illustrated in FIG. 1.

FIG. 11 is a block diagram illustrating another embodiment of an encoder device that may be used in a system such as illustrated in FIG. 1. The example encoder device 110 of FIG. 11 includes first encoder means for encoding a first portion of multimedia data using inter-coding to generate a first version, and second encoder means for encoding the first portion of multimedia data using intra-coding to generate a second version. The first encoder means may comprise a module for encoding using inter-coding 1105 of FIG. 11. The second encoder means may comprise a module for encoding using intra-coding 1110 of FIG. 11.

Figure 12:
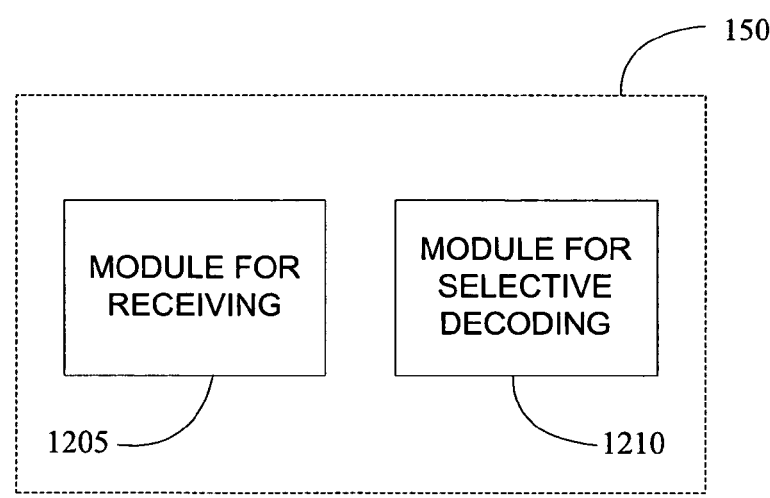
FIG. 12 is a block diagram illustrating another embodiment of a decoder device that may be used in a system such as illustrated in FIG. 1.

FIG. 12 is a block diagram illustrating another embodiment of a decoder device that may be used in a system such as illustrated in FIG. 1. The example decoder device 150 of FIG. 12 includes means for receiving a first version of a first portion of multimedia data, wherein the first version is inter-coded, and receiving a second version of the first portion of multimedia data, wherein the second version is intra-coded. The decoder device 150 further includes means for selectively decoding the first and second received versions. The means for receiving may comprise module for receiving 1205 of FIG. 12. The means for selectively decoding may comprise a module for selective decoding 1210 of FIG. 12.

Figure 13:
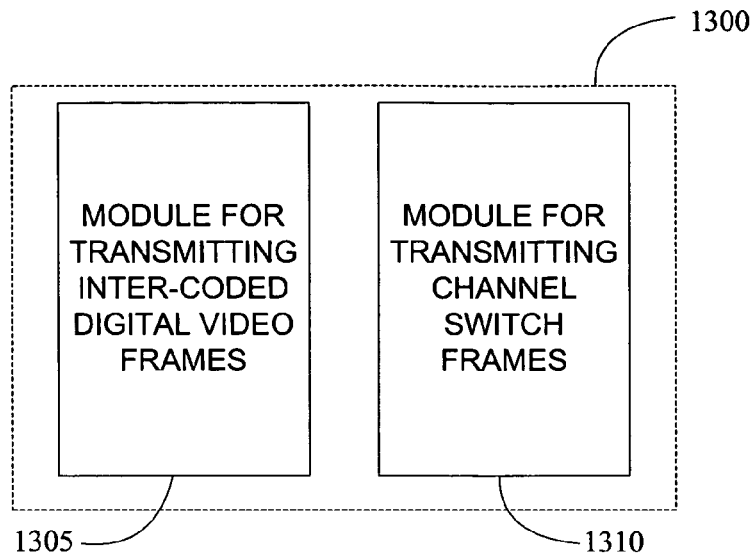
FIG. 13 is a block diagram illustrating an embodiment of an apparatus for transmitting digital video data that may be used in a system such as illustrated in FIG. 1.

FIG. 13 is a block diagram illustrating an embodiment of an apparatus for transmitting digital video data that may be used in a system such as illustrated in FIG. 1. The example apparatus 1300 of FIG. 13 includes means for transmitting inter-coded digital video frames for each of a plurality of digital video channels, and means for transmitting channel switch frames for each of the channels, wherein at least one of the channel switch frames comprises intra-coded digital video data corresponding to one of the inter-coded frames for the respective channel. The means for transmitting inter-coded digital video frames may comprise a module 1305 for transmitting inter-coded digital video frames. The means for transmitting channel switch frames may comprise a module 1310 for transmitting channel switch frames.

Figure 14:
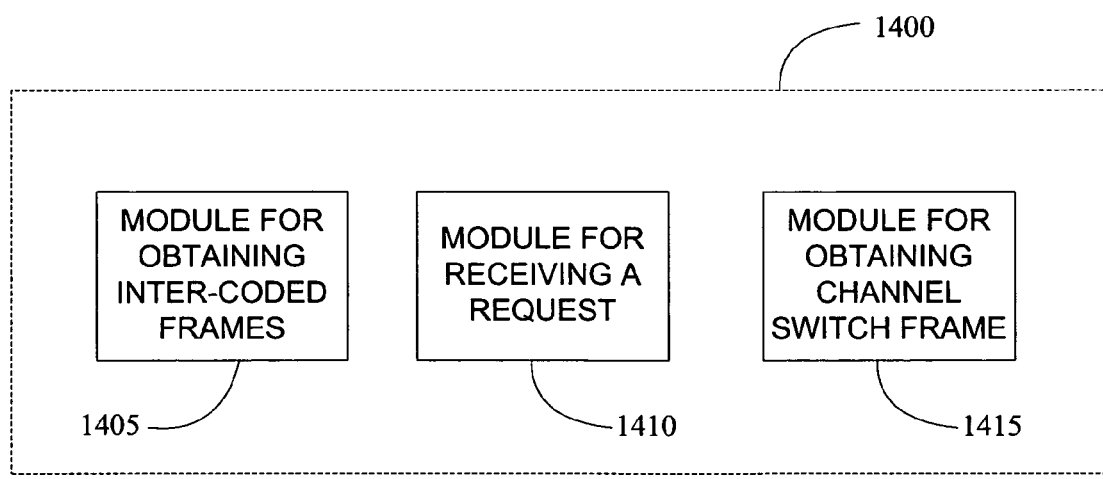
FIG. 14 is a block diagram illustrating an embodiment of an apparatus for receiving digital video data that may be used in a system such as illustrated in FIG. 1.

FIG. 14 is a block diagram illustrating an embodiment of an apparatus for receiving digital video data that may be used in a system such as illustrated in FIG. 1. The example apparatus 1400 of FIG. 13 includes means for obtaining inter-coded frames that comprise inter-coded digital video data associated with a first channel, means for receiving a request to switch to a second channel. The apparatus 1400 further includes, in response to the request, means for obtaining a channel switch frame comprising intra-coded digital video data corresponding to one of the inter-coded frames for the second channel. The means for obtaining the inter-coded frames may comprise a module 1405 for obtaining inter-coded frames. The means for receiving the request may comprise a module 1410 for receiving a request. The means for obtaining the channel switch frame may comprise a module 1415 for obtaining the channel switch frame.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

Thus, methods and apparatus to perform temporal error concealment of erroneous bi-directional predicted multimedia data have been described.

What is claimed is:

1. A method of processing multimedia data, comprising: using a computer or processor to perform the steps of:

encoding a first portion of multimedia data using inter-coding to generate a first version associated with a first quality level;

encoding the first portion of the multimedia data using intra-coding to generate a second version associated with a second quality level that is lower than the first quality level, wherein no portion of multimedia data encoded subsequent to the first portion is encoded with reference to a portion of multimedia data encoded prior to the first portion; and generating reference information indicating that the intra-coded second version is available and redundant and indicating locations of the multimedia data represented by the first and second versions, wherein the reference information indicating the locations comprises data that indicates where the inter-coded and intra-coded data generated by the encoding are located.

2. The method of claim 1, wherein the first portion comprises a first frame of a group of frames of the multimedia data.

3. The method of claim 2, further comprising encoding a second frame located subsequent to the first frame, wherein the second frame is encoded without reference to data in any preceding frame of the group of frames.

4. The method of claim 2, wherein generating the reference information indicating that the intra-coded second version is redundant comprises generating information identifying a frame sequence number of a frame containing the first portion.

5. The method of claim 1, wherein the first portion comprises part of an entire frame that excludes one or more second portions and is located in a first frame of a group of frames of the multimedia data, the method further comprising:

encoding one or more of the second portions by intra-coding, wherein the one or more second portions are located in one or more second frames of the group of frames.

6. The method of claim 1, further comprising:
   transmitting the first version;
   transmitting the second version; and
   transmitting the reference information separately from the first version and the second version.

7. The method of claim 6, wherein transmitting the first version comprises transmitting over a first communication link, and transmitting the second version comprises transmitting over a second communication link.

8. The method of claim 7, wherein transmitting over the first communication link or transmitting over the second communication link comprises transmitting over a virtual channel.

9. The method of claim 6, wherein the transmission of the first and second versions occur over one communication link.

10. The method of claim 1, wherein the reference information indicating the locations comprises identifiers of blocks of pixels that are used by a decoder to locate a position within a frame.

11. The method of claim 1, wherein the reference information indicating the locations comprises a frame sequence number used to locate a frame within a video frame sequence.

12. The method of claim 1, wherein the reference information indicating the locations comprises a predetermined frame number or a predetermined sequence of blocks of pixels such that a decoder knows in advance that the first version and the second version will be received for a certain frame portion at a certain time of the bitstream.

13. The method of claim 1, wherein the intra-coded second version comprises a channel switch frame.

14. The method of claim 1, wherein the first version is associated with a first quantization parameter value and the second version is associated with a second quantization parameter value that is greater than the first quantization parameter value.

15. An apparatus for processing multimedia data comprising:
- a first encoder to encode a first portion of multimedia data using inter-coding to generate a first version associated with a first quality level;
- a second encoder to encode the first portion of the multimedia data using intra-coding to generate a second version associated with a second quality level that is lower than the first quality level, wherein no portion of multimedia data encoded subsequent to the first portion is encoded with reference to a portion of multimedia data encoded prior to the first portion; and
- a generator to generate reference information indicating that the intra-coded second version is available and redundant and indicating locations of the multimedia data represented by the first and second versions, wherein the reference information indicating the locations comprises data that indicates where the inter-coded and intra-coded data generated by the first encoder and the second encoder are located.

16. The apparatus of claim 15, wherein the first portion of multimedia data comprises a first frame of a group of frames of the multimedia data.

17. The apparatus of claim 16, wherein the first encoder encodes multimedia data of a second frame located subsequent to the first frame, wherein the second frame multimedia data is encoded without reference to data in any preceding frame of the group of frames.

18. The apparatus of claim 16, wherein the reference information indicating that the intra-coded second version is redundant comprises information identifying a frame sequence number of a frame containing the first portion.

19. The apparatus of claim 15, wherein the first portion comprises part of an entire frame that excludes one or more second portions and is located in a first frame of a group of frames of the multimedia data, and the second encoder encodes one or more of the second portions using intra-coding, and further wherein the one or more second portions are located in one or more second frames of the group of frames.

20. The apparatus of claim 15, further comprising a transmitter to transmit the first version, the second version and the generated reference information, wherein the generated reference information is transmitted separately from the first version and the second version.

21. The apparatus of claim 20, wherein the transmitter transmits the first version over a first communication link, and transmits the second version over a second communication link.

22. The apparatus of claim 21, wherein the first communication link or the second communication link comprises a virtual channel.

23. The apparatus of claim 20, wherein the first and second versions are transmitted over one communication link.

24. The apparatus of claim 15, wherein the reference information indicating the locations comprises identifiers of blocks of pixels that are used by a decoder to locate a position within a frame.

25. The apparatus of claim 15, wherein the reference information indicating the locations comprises a frame sequence number used to locate a frame within a video frame sequence.

26. The apparatus of claim 15, wherein the reference information indicating the locations comprises a predetermined frame number or a predetermined sequence of blocks of pixels such that a decoder knows in advance that the first version and the second version will be received for a certain frame portion at a certain time of the bitstream.

27. The apparatus of claim 15, wherein the intra-coded second version comprises a channel switch frame.

28. The apparatus of claim 15, wherein the first version is associated with a first quantization parameter value and the second version is associated with a second quantization parameter value that is greater than the first quantization parameter value.

29. An apparatus for processing multimedia data, comprising:
- first encoder means for encoding a first portion of multimedia data using inter-coding to generate a first version associated with a first quality level;
- second encoder means for encoding, the first portion of the multimedia data using intra-coding to generate a second version associated with a second quality level that is lower than the first quality level, wherein no portion of multimedia data encoded subsequent to the first portion is encoded with reference to a portion of multimedia data encoded prior to the first portion; and
- means for generating reference information indicating the intra-coded second version is available and redundant and indicating locations of the multimedia data represented by the first and second versions, wherein the reference information indicating the locations comprises data that indicates where the inter-coded and intra-coded data generated by the first encoder means and the second encoder means are located.

30. The apparatus of claim 29, wherein the first portion comprises a first frame of a group of frames of the multimedia data.

31. The apparatus of claim 30, wherein the first encoder means encodes a second frame located subsequent to the first frame, wherein the second frame is encoded without reference to data in any preceding frame of the group of frames.

32. The apparatus of claim 30, wherein the means for generating generates information identifying a frame sequence number of a frame containing the first portion.

33. The apparatus of claim 29, wherein the first portion comprises part of an entire frame that excludes one or more second portions and is located in a first frame of a group of frames of the multimedia data, and the second encoder means encodes one or more of the second portions using intra-coding, wherein the one or more second portions are located in one or more second frames of the group of frames.

34. The apparatus of claim 29, further comprising means for transmitting the first version, the second version, and the reference information, wherein the means for transmitting comprises means for transmitting the generated reference information separately from the first version and the second version.

35. The apparatus of claim 34, wherein the means for transmitting transmits the first version over a first communication link, and transmits the second version over a second communication link.

36. The apparatus of claim 35, wherein the first communication link or the second communication link comprises a virtual channel.

37. The apparatus of claim 34, wherein the means for transmitting transmits the first and second versions over one communication link.

38. A machine readable medium comprising instructions that upon execution cause a machine to:
 encode a first portion of multimedia data using inter-coding to generate a first version associated with a first quality level;
 encode the first portion of the multimedia data using intra-coding to generate a second version associated with a second quality level that is lower than the first quality level, wherein no portion of multimedia data encoded subsequent to the first portion is encoded with reference to a portion of multimedia data encoded prior to the first portion; and
 generate reference information indicating that the intra-coded second version is available and redundant and indicating locations of the multimedia data represented by the first and second versions, wherein the reference information indicating the locations comprises data that indicates where the inter-coded and intra-coded data generated by the encoding are located.

39. The machine readable medium of claim 38, wherein the first portion comprises a first frame of a group of frames of the multimedia data.

40. The machine readable medium of claim 39, further comprising instructions that upon executing cause a machine to encode a second frame located subsequent to the first frame, wherein the second frame is encoded without reference to data in any preceding frame of the group of frames.

41. The machine readable medium of claim 39, wherein the reference information indicating that the intra-coded second version is redundant comprises information identifying a frame sequence number of a frame containing the first portion.

42. The machine readable medium of claim 38, wherein the first portion comprises part of an entire frame that excludes one or more second portions and is located in a first frame of a group of frames of the multimedia data, and the machine readable medium further comprises instructions that upon executing cause a machine to:
 encode one or more of the second portions by intra-coding, wherein the one or more second portions are located in one or more second frames of the group of frames.

43. The machine readable medium of claim 38, further comprising instructions that upon executing cause a machine to:
 transmit the first version;
 transmit the second version; and
 transmit the reference information separately from the first version and the second version.

44. The machine readable medium of claim 43, further comprising instructions that upon executing cause a machine to:
 transmit the first version over a first communication link; and
 transmit the second version over a second communication link.

45. The machine readable medium of claim 44, wherein the transmission over the first communication link or the transmission over the second communication link comprises transmitting over a virtual channel.

46. The machine readable medium of claim 43, wherein the transmission of the first and second versions occur over one communication link.

47. The machine readable medium of claim 38, wherein the reference information indicating the locations comprises identifiers of blocks of pixels that are used by a decoder to locate a position within a frame.

48. The machine readable medium of claim 38, wherein the reference information indicating the locations comprises a frame sequence number used to locate a frame within a video frame sequence.

49. The machine readable medium of claim 38, wherein the reference information indicating the locations comprises a predetermined frame number or a predetermined sequence of blocks of pixels such that a decoder knows in advance that the first version and the second version will be received for a certain frame portion at a certain time of the bitstream.

50. The machine readable medium of claim 38, wherein the intra-coded second version comprises a channel switch frame.

51. The machine readable medium of claim 38, wherein the first version is associated with a first quantization parameter value and the second version is associated with a second quantization parameter value that is greater than the first quantization parameter value.

* * * * *

UNITED STATES PATENT AND TRADEMARK OFFICE
CERTIFICATE OF CORRECTION

| | | |
|---|---|---|
| PATENT NO. | : 8,229,983 B2 | |
| APPLICATION NO. | : 11/527306 | |
| DATED | : July 24, 2012 | |
| INVENTOR(S) | : Walker et al. | |

It is certified that error appears in the above-identified patent and that said Letters Patent is hereby corrected as shown below:

On the title page item 75 Inventor: "Sitaraman Ganapathy Subramania" to be corrected to --Sitaraman Ganapathy Subramanian--

Signed and Sealed this
Sixteenth Day of February, 2016

Michelle K. Lee
*Director of the United States Patent and Trademark Office*